United States Patent
Mikami et al.

(10) Patent No.: US 10,447,890 B2
(45) Date of Patent: Oct. 15, 2019

(54) IMAGE READING APPARATUS WITH SHADING CORRECTION

(71) Applicant: CANON KABUSHIKI KAISHA, Tokyo (JP)

(72) Inventors: Ryo Mikami, Tokyo (JP); Yushi Oka, Abiko (JP); Masato Furukawa, Nagareyama (JP); Kaoru Hamada, Nagareyama (JP); Shinichi Ikoma, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/697,944

(22) Filed: Sep. 7, 2017

(65) Prior Publication Data
US 2018/0084146 A1 Mar. 22, 2018

(30) Foreign Application Priority Data

Sep. 16, 2016 (JP) .................. 2016-181274
Sep. 16, 2016 (JP) .................. 2016-181276

(51) Int. Cl.
*H04N 1/401* (2006.01)
*H04N 1/00* (2006.01)
(Continued)

(52) U.S. Cl.
CPC ......... *H04N 1/401* (2013.01); *H04N 1/00588* (2013.01); *H04N 1/00615* (2013.01);
(Continued)

(58) Field of Classification Search
CPC combination set(s) only.
See application file for complete search history.

(56) References Cited

U.S. PATENT DOCUMENTS 6,075,621 A     6/2000   Takeuchi et al. ............. 358/461
7,408,682 B2 *  8/2008   Ide ......................... H04N 1/401
                                                         358/461
(Continued)

FOREIGN PATENT DOCUMENTS

CN      1173775       2/1998
CN      102346400     2/2012
(Continued)

OTHER PUBLICATIONS

Extended European Search Report dated Feb. 13, 2018, in counterpart European Application No. 17190293.5.
(Continued)

*Primary Examiner* — Barbara D Reinier
(74) *Attorney, Agent, or Firm* — Venable LLP

(57) ABSTRACT

Provided is an image reading apparatus for suppressing an image defect ascribable to shading correction using a white reference plate arranged at a position different from a reading position of an original. The image reading apparatus includes a reading unit configured to read an image from the original passing through the reading position, the white reference plate arranged such that a distance between the reading unit and the white reference plate is larger than the distance between the reading unit and the reading position, and a control system. The control system includes a memory for backup configured to store in advance correlation data representing a correlation between a reading result of the white reference plate obtained by the reading unit, and a reading result of a reference member having a uniform density and arranged at the reading position.

4 Claims, 23 Drawing Sheets

(51) Int. Cl.
*H04N 1/028* (2006.01)
*H04N 1/407* (2006.01)
*H04N 1/409* (2006.01)

(52) U.S. Cl.
CPC ......... *H04N 1/02835* (2013.01); *H04N 1/407* (2013.01); *H04N 1/409* (2013.01); *H04N 1/00026* (2013.01); *H04N 1/0289* (2013.01); *H04N 2201/0081* (2013.01); *H04N 2201/0094* (2013.01)

(56) References Cited

U.S. PATENT DOCUMENTS

| 8,345,327 | B2 | 1/2013 | Mikami | 358/475 |
| 8,482,809 | B2 | 7/2013 | Mikami | 358/406 |
| 8,488,219 | B2 | 7/2013 | Mikami | 358/475 |
| 8,786,920 | B2 | 7/2014 | Mikami | 358/509 |
| 2008/0204820 | A1* | 8/2008 | Ito | H04N 1/4076 358/461 |
| 2012/0020680 | A1 | 1/2012 | Zaima | 399/15 |
| 2015/0288837 | A1 | 10/2015 | Morikawa | H04N 1/00729 |
| 2015/0381854 | A1 | 12/2015 | Horiguchi | 358/406 |
| 2017/0214816 | A1 | 7/2017 | Yamakawa et al. | H04N 1/04 |

FOREIGN PATENT DOCUMENTS

| CN | 105282379 | 1/2016 |
| JP | 2002-335380 | 11/2002 |
| JP | 2011-151478 | 8/2011 |

OTHER PUBLICATIONS

U.S. Appl. No. 15/625,963, filed Jun. 16, 2017.
U.S. Appl. No. 15/697,925, filed Sep. 7, 2017.
CN Office Action dated May 17, 2019 in counterpart CN Application No. 201710814638.2 with English translation.

* cited by examiner

IMAGE READING APPARATUS WITH SHADING CORRECTION

BACKGROUND OF THE INVENTION

Field of the Invention

The present invention relates to an image reading apparatus configured to read an image formed on an original (hereinafter referred to as "original image").

Description of the Related Art

A copying machine and a multifunction printer include an image reading apparatus for reading an image from an original. There is proposed an image reading apparatus configured to read both a front surface and a back surface of the original at a time in order to increase throughput of the reading of an original image and to reduce or prevent damage to the original due to conveyance of the original. An image reading apparatus disclosed in Japanese Patent Application Laid-open No. 2002-335380 includes a first reading unit configured to read one surface of an original and a second reading unit configured to read another surface of the original, and is capable of reading both the front surface and the back surface of the original at a time. A white reference plate for conducting shading correction by the second reading unit is provided at such a position opposed to the second reading unit across a flow reading glass so as not to block an optical path of the first reading unit. To that end, from the second reading unit, the white reference plate is arranged at a position farther than a reading position to be used to read the original by the second reading unit. The image reading apparatus having such a configuration achieves a compact configuration that prevents the white reference plate and the original from being brought into contact with each other and enables the white reference plate to be hardly stained.

A reading unit of the image reading apparatus is configured to apply light from a light source to the white reference plate, and to receive light reflected by the white reference plate by a light receiver. The image reading apparatus is configured to conduct the shading correction based on a result of receiving the reflected light. Because the distance between the light source and the white reference plate is larger than the distance between the light source and the reading position of the original, the applied light disperses to a larger degree than when the original is read. Therefore, the white reference plate exhibits a smaller amount of the applied light, as well as a smaller amount of the reflected light, in both end portions of the reading unit in a main scanning direction than in a central portion of the reading unit in the main scanning direction. For that reason, when the white reference plate arranged at the position farther than the reading position of the original is used to calculate a shading coefficient, brightness in both end portions in the main scanning direction are lower than a brightness in the central portion, and hence the shading coefficients for both end portions become higher than the shading coefficient for the central portion. When the shading correction is conducted through use of such shading coefficients, the brightness in both end portions in the main scanning direction become higher than the brightness in the central portion.

In addition, the degree of dispersion of the applied light differs between the white reference plate and the reading position of the original, and hence in the vicinity of the center in the main scanning direction, the white reference plate and the reading position of the original do not exhibit the same brightness distribution in the main scanning direction. Therefore, image unevenness or other such read image defect may occur in the original image subjected to the shading correction through use of the shading coefficients generated based on the white reference plate.

The present invention has been made in view of the above-mentioned problems, and has an object to provide an image reading apparatus for suppressing an image defect ascribable to shading correction using a white reference plate arranged at a position different from a reading position of an original.

SUMMARY OF THE INVENTION

An image reading apparatus according to the present disclosure includes: a conveyor configured to convey an original; a guide member configured to guide the original being conveyed along a conveyance direction by the conveyor; a reading unit configured to read the original being conveyed by the conveyor; a reference member provided on a side of the guide member, which is opposite to a region in which the original is conveyed; an acquisition unit configured to acquire shading data based on a result of reading the reference member by the reading unit; a shading corrector configured to conduct shading correction on a result of reading the original by the reading unit based on the shading data and a correction coefficient; and a calculator configured to calculate the correction coefficient based on a result of reading a reference original located on the guide member.

Further features of the present invention will become apparent from the following description of exemplary embodiments (with reference to the attached drawings).

DESCRIPTION OF THE EMBODIMENTS

Now, embodiments of the present invention are described below in detail with reference to the accompanying drawings.

First Embodiment

Overall Configuration

Figure 1:
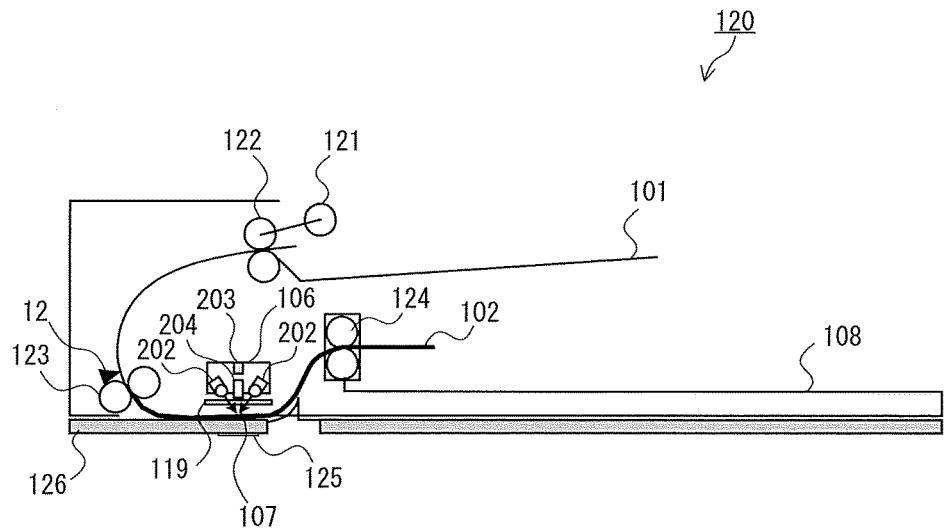
FIG. 1 is a configuration diagram of an image reading apparatus.

FIG. 1 is a configuration diagram of an image reading apparatus provided with an automatic document feeding mechanism according to a first embodiment of the present invention. An image reading apparatus 120 includes an original tray 101 on which originals 102 that have not been read are to be stacked, a delivery tray 108 to which the original 102 that has been read is to be delivered, and a reading unit 106 configured to read an original image from the original 102. The original 102 is conveyed along a conveyance path from the original tray 101 to the delivery tray 108 through a reading position 107 to be used by the reading unit 106. The image reading apparatus 120 is configured to read the original image of the original 102 conveyed to the reading position 107 by the reading unit 106.

An original pickup roller 121, original separating rollers 122, original conveying rollers 123, and original offset rollers 124 are provided along the conveyance path. The original pickup roller 121 is configured to take the originals 102 stacked on the original tray 101 into the image reading apparatus 120. The original separating rollers 122 are configured to separate the originals 102 taken in by the original pickup roller 121 from each other, and to convey the original 102 along the conveyance path. The original conveying rollers 123 are configured to convey the original 102, which has been conveyed by the original separating rollers 122, to the reading position 107. The original offset rollers 124 are configured to convey the original 102 from the reading position 107, and to deliver the original 102 to the delivery tray 108. An original sensor 12 is provided on an upstream side of the original conveying rollers 123 in a conveyance direction of the original 102. The original sensor 12 is configured to detect the original 102 being conveyed.

The reading position 107 to be used by the reading unit 106 is defined at a predetermined position midway through the conveyance path and between an original reading glass 119 and an original table glass 126. The original 102 is conveyed between the original reading glass 119 and the original table glass 126. A white reference plate 125 for calculating a shading coefficient to be used for shading correction is provided at a position opposed to the reading position 107 across the original table glass 126.

In the first embodiment, the reading unit 106 is formed of a contact image sensor (CIS). The reading unit 106 includes alight guiding body 202 configured to apply light emitted from a light source (not shown) to the original 102 conveyed to the reading position 107, a line sensor 203, and a lens 204 configured to condense light reflected by the original 102 onto the line sensor 203. The light source is a light emitter configured such that a plurality of light-emitting elements, for example, light emitting diodes (LEDs), are arranged in a straight line along a direction perpendicular to the conveyance direction of the original 102. The line sensor 203 is a light receiver configured such that a plurality of light-receiving elements, for example, complementary metal oxide semiconductor (CMOS) image sensors, are arranged in a straight line along the direction perpendicular to the conveyance direction of the original 102 in the same manner as the light source. The reading unit 106 is configured to photo-electrically convert the light reflected by the original 102 and received by the line sensor 203, and to output an analog image signal being an analog electric signal corresponding to an amount of reflected and received light. The analog image signal has a value changed depending on a density of the original image. A direction in which the light-emitting elements and the light-receiving elements are arranged in a straight line (direction perpendicular to the conveyance direction of the original 102) corresponds to a main scanning direction used by the reading unit 106 to read the original image from the original 102.

Control System

Figure 2:
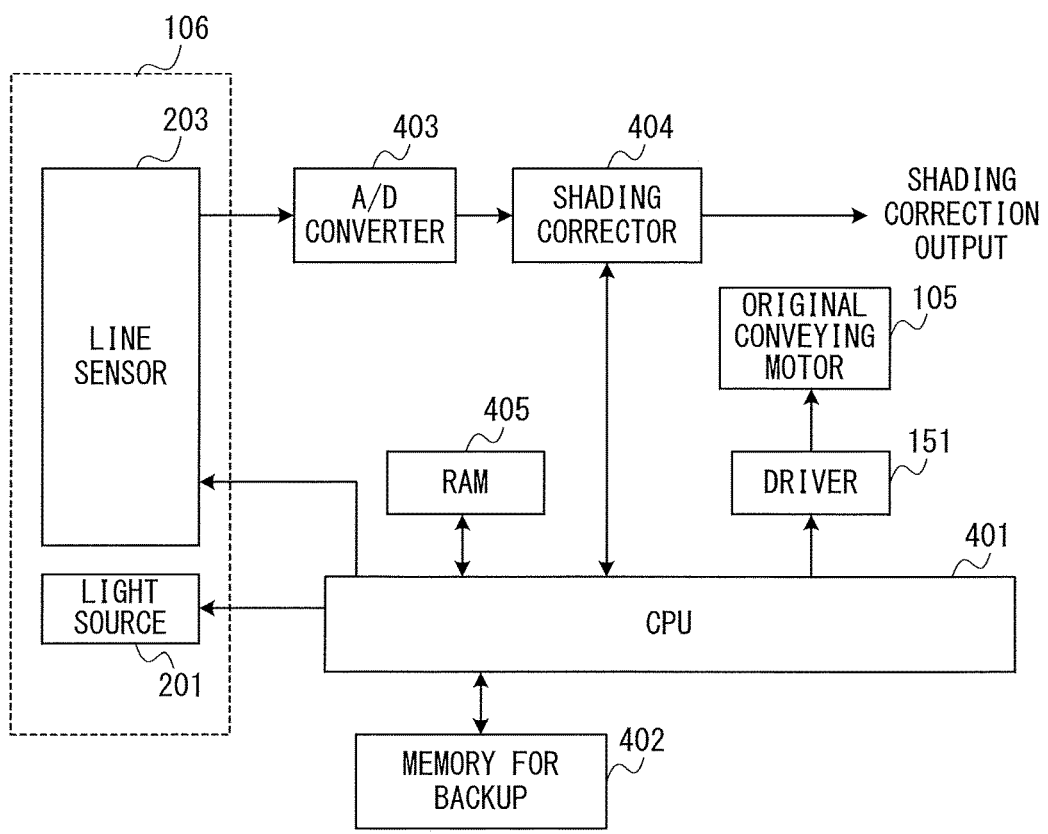
FIG. 2 is a configuration diagram of a control system.

FIG. 2 is a configuration diagram of a control system for controlling an operation of the image reading apparatus 120. The control system is built into the image reading apparatus 120. The control system is configured to execute operation control of the image reading apparatus 120 by a central processing unit (CPU) 401. The CPU 401 is connected to the reading unit 106, a driver 151, a memory 402 for backup, a random access memory (RAM) 405, and a shading corrector 404. The driver 151 is connected to an original conveying motor 105. In addition, the control system includes an A/D converter 403.

The CPU 401 is configured to conduct drive control of the original conveying motor 105 by the driver 151. The original conveying motor 105 is configured to rotationally drive the original pickup roller 121, the original separating rollers 122, the original conveying rollers 123, and the original offset rollers 124, which are provided along the conveyance path. The CPU 401 is configured to control the operation of each roller by the driver 151, to thereby convey the original 102 along the conveyance path.

The CPU 401 is configured to conduct light emission control of a light source 201 of the reading unit 106, and to cause the line sensor 203 to output the analog image signal.

The line sensor 203 inputs the analog image signal to the A/D converter 403. The A/D converter 403 is configured to convert the analog image signal input from the line sensor 203 into a digital image signal. The A/D converter 403 inputs the digital image signal to the shading corrector 404. The shading corrector 404 is configured to conduct the shading correction for suppressing an influence of nonuniformity in light amount of the light source 201 and an influence of unevenness in sensitivity of the light-receiving elements of the line sensor 203.

The memory 402 for backup is a non-volatile memory, and is configured to store different kinds of data required for the shading correction. The memory 402 for backup is configured to allow data to be written thereto and read therefrom by the CPU 401. The CPU 401 is configured to transmit and receive data between the memory 402 for backup and the shading corrector 404. The RAM 405 is configured to provide a temporary storage area to be used by the CPU 401 to conduct processing. In the first embodiment, the RAM 405 is used to temporarily store data during the shading correction.

In the first embodiment, the CPU 401 controls different kinds of processing. Instead of the CPU 401, at least one of an IC, an SOC, or other such processor may be used to control those kinds of processing.

Shading Correction

A description is made of the shading correction conducted by the shading corrector 404. The analog image signal output from the line sensor 203 includes a brightness value of each of pixels along the main scanning direction. The digital image signal obtained by converting the analog image signal by the A/D converter 403 includes a digital value of the brightness value of each of the pixels along the main scanning direction. The shading corrector 404 is configured to conduct the shading correction through use of the digital value of the brightness value of each of the pixels along the main scanning direction as an original read value, to thereby derive a shading correction output value. The shading corrector 404 is configured to calculate the shading correction output value based on, for example, the following expression.

(Shading correction output value)($n$)=
{(original read value)($n$)/(shading coefficient)($n$)}×
(read target value)        Expression (1)

$n$: a position of the pixel in the main scanning direction

Shading coefficient: a coefficient for conducting the shading correction

Read target value: a target value of a read value to be obtained when the white reference plate 125 is read The shading coefficient is generated by the CPU 401 based on correlation data described later. The correlation data and the read target value are stored in the memory 402 for backup. The shading corrector 404 is configured to acquire the shading coefficient from the CPU 401, and to acquire the read target value from the memory 402 for backup via the CPU 401. The shading corrector 404 may be configured to output "(original read value) (n)" as "(shading correction output value) (n)" as it is without use of the shading coefficient. That is, (shading correction output value) (n)=(original read value) (n) is established. This processing is referred to as "shading correction disabled".

Figure 3A:
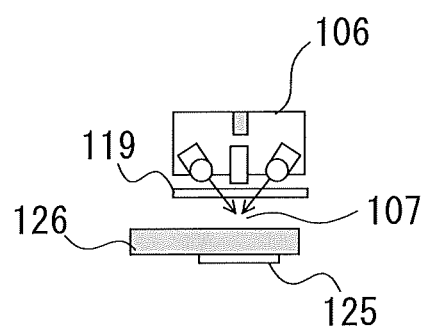
FIG. 3A and FIG. 3B are each an explanatory diagram of a reading state.
Figure 3B:
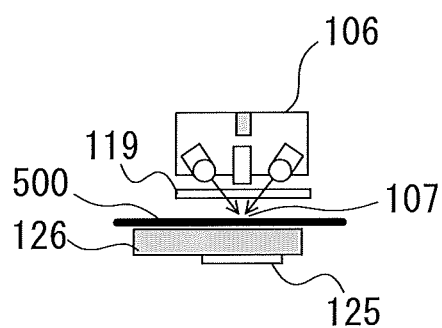

FIG. 3A and FIG. 3B are each an explanatory diagram of a reading state exhibited by the reading unit 106. FIG. 3A is an illustration of a state of reading the white reference plate 125. FIG. 3B is an illustration of a state of placing a reference member 500 having a uniform density in the main scanning direction at the reading position 107 and reading the reference member 500. The reference member 500 is placed at the reading position 107 by an operator with his or her hand. There is no limitation imposed on color or luminance of the reference member 500 as long as the reference member 500 has a fixed density in the main scanning direction. The first embodiment is directed to a case of using the reference member 500 being white.

Figure 4A:
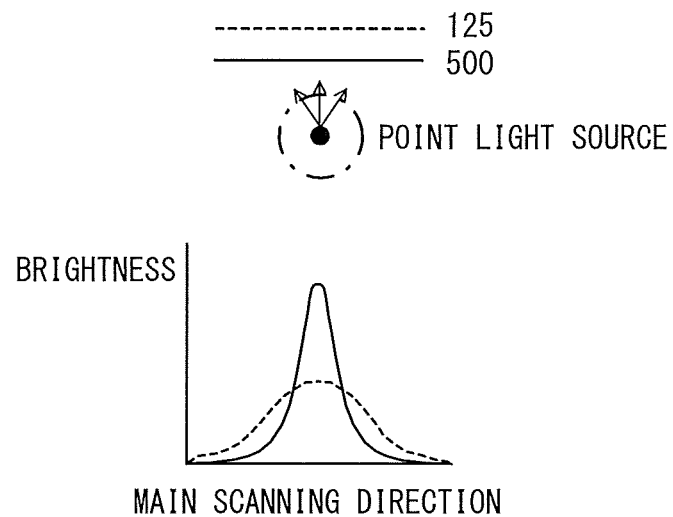
FIG. 4A and FIG. 4B are each an explanatory diagram and an explanatory graph of illumination brightness distribution data.
Figure 4B:
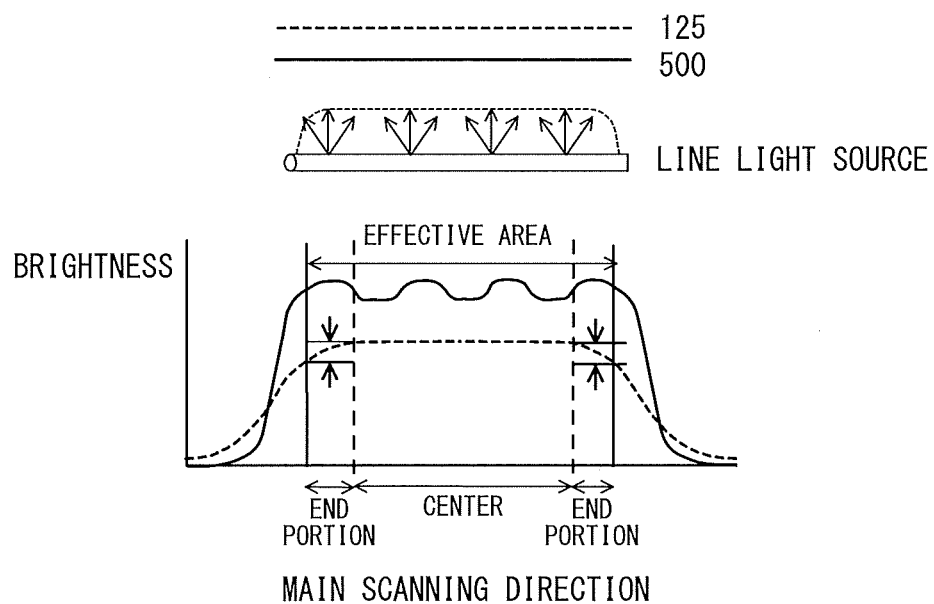

The memory 402 for backup is configured to store the correlation data representing a correlation between illumination brightness distribution data in the main scanning direction, which is obtained as a result of reading the white reference plate 125, and illumination brightness distribution data in the main scanning direction, which is obtained as a result of reading the reference member 500. FIG. 4A and FIG. 4B are each an explanatory diagram and an explanatory graph of the illumination brightness distribution data. In FIG. 4A, the illumination brightness distribution data obtained as a result of conducting the reading by emitting light from a point light source is shown. In FIG. 4B, the illumination brightness distribution data obtained as a result of conducting the reading by emitting light from a line light source is shown. The dotted line indicates a reading result of the white reference plate 125, and the solid line indicates a reading result of the reference member 500.

The reading result of the white reference plate 125 has the following feature. As illustrated in FIG. 3A, the white reference plate 125 is arranged at a position farther from the reading unit 106 than the reading position 107 by a thickness of the original table glass 126. Therefore, an absolute brightness of light applied to the white reference plate 125 is lower than an absolute brightness of light applied to the reading position 107. In addition, an optical path length between the reading unit 106 and the white reference plate 125 is longer than an optical path length between the reading unit 106 and the reading position 107. Therefore, the light emitted from the reading unit 106 is diffused in the main scanning direction, to thereby cause the illumination brightness distribution data obtained by reading the white reference plate 125 to become data that is broad in the main scanning direction as shown in FIG. 4B. The line light source is formed by arranging point light sources in an array. Therefore, the illumination brightness distribution data based on the line light source in FIG. 4B corresponds to a series of pieces of illumination brightness distribution data based on the point light source in FIG. 4A. Hence, the illumination brightness distribution data obtained by reading the white reference plate 125 through use of the line light source has a smaller value for end portions than for a central portion in the main scanning direction (indicated by the dotted line in FIG. 4B).

The reading result of the reference member 500 has the following feature. As illustrated in FIG. 3B, the reference member 500 is located at the reading position 107. Therefore, the absolute brightness of the light applied to the reference member 500 is higher than the absolute brightness of the light applied to the white reference plate 125. In addition, the optical path length between the reading unit 106 and the reference member 500 is shorter than the optical path length between the reading unit 106 and the white reference plate 125. Therefore, an amount of diffusion of the light emitted from the reading unit 106 in the main scanning direction is smaller than in the case of the white reference plate 125, and the illumination brightness distribution data obtained by reading the reference member 500 is data having peaks in the main scanning direction as shown in FIG. 4B. In addition, the illumination brightness distribution data obtained as a result of reading the reference member 500 through use of the line light source (indicated by the solid line in FIG. 4B) exhibits a substantially flat shape in the central portion and the end portions in the main scanning direction.

Processing for Storing Correlation Data

Figure 5:
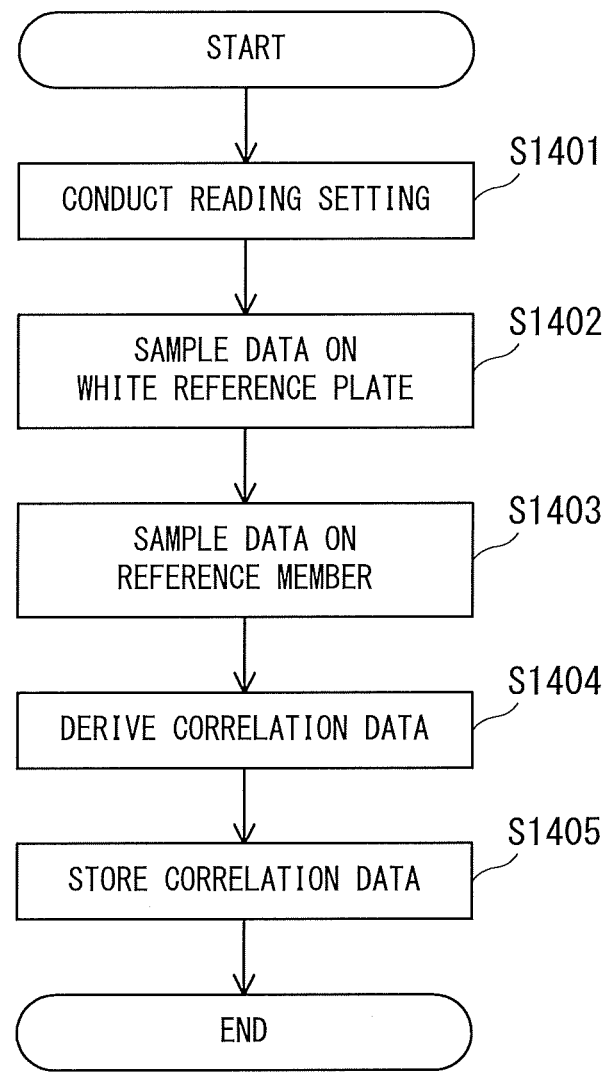
FIG. 5 is a flowchart for illustrating a method of storing correlation data.

FIG. 5 is a flowchart for illustrating a method of storing the correlation data on the illumination brightness distribution data in the memory 402 for backup.

The CPU 401 conducts reading setting under a state under which, as illustrated in FIG. 3A, the reading unit 106 is brought into abutment with the original table glass 126 (Step S1401). The CPU 401 conducts the reading setting based on a reading start signal input from an operation unit (not shown). For example, the CPU 401 causes the light source 201 to emit light, controls the reading using the line sensor 203, and disables the shading correction based on the reading setting.

The CPU 401 samples data representing the reading result of the white reference plate 125 obtained by the reading unit 106 (Step S1402). The CPU 401 stores a sampled data pieceX (n) being the reading result of the white reference plate 125 in the RAM 405. In this case, n represents the position (pixel) in the main scanning direction. The data pieceX (n) represents the illumination brightness distribution data indicated by, for example, the dotted line in FIG. 4B.

After the data on the white reference plate 125 is sampled, the operator places the reference member 500 at the reading position 107 as illustrated in FIG. 3B. After placing the reference member 500, the operator inputs the reading start signal to the CPU 401 through the operation unit. The input causes the CPU 401 to sample data representing the reading result of the reference member 500 obtained by the reading unit 106 (Step S1403). The CPU 401 stores a sampled data pieceY (n) being the reading result of the reference member 500 in the RAM 405. The data piece Y(n) represents the illumination brightness distribution data indicated by, for example, the solid line in FIG. 4B.

The CPU 401 derives the correlation data based on the data piece X(n) being the reading result of the white reference plate 125 and the data piece Y(n) being the reading result of the reference member 500 (Step S1404). In this case, the CPU 401 reads the data piece X(n) and the data piece Y(n) from the RAM 405. The CPU 401 divides the read data piece Y(n) by the read data piece X(n), to thereby calculate a correlation data piece Z(n) ($Z(n)=Y(n)/X(n)$). The CPU 401 may hold in advance a table for showing a relationship between the correlation data piece Z(n) and a set of the data piece X(n) and the data piece Y(n), and may refer to the table to derive the correlation data piece Z(n). The CPU 401 stores the derived correlation data piece Z(n) in the memory 402 for backup, and brings the processing to an end (Step S1405).

The correlation data is stored in the memory 402 for backup at a time of factory shipment of the image reading apparatus 120, a timing when the reading unit 106 is replaced, a timing when a control board on which the memory 402 for backup is mounted fails or is replaced, or other such timing.

Figure 6:
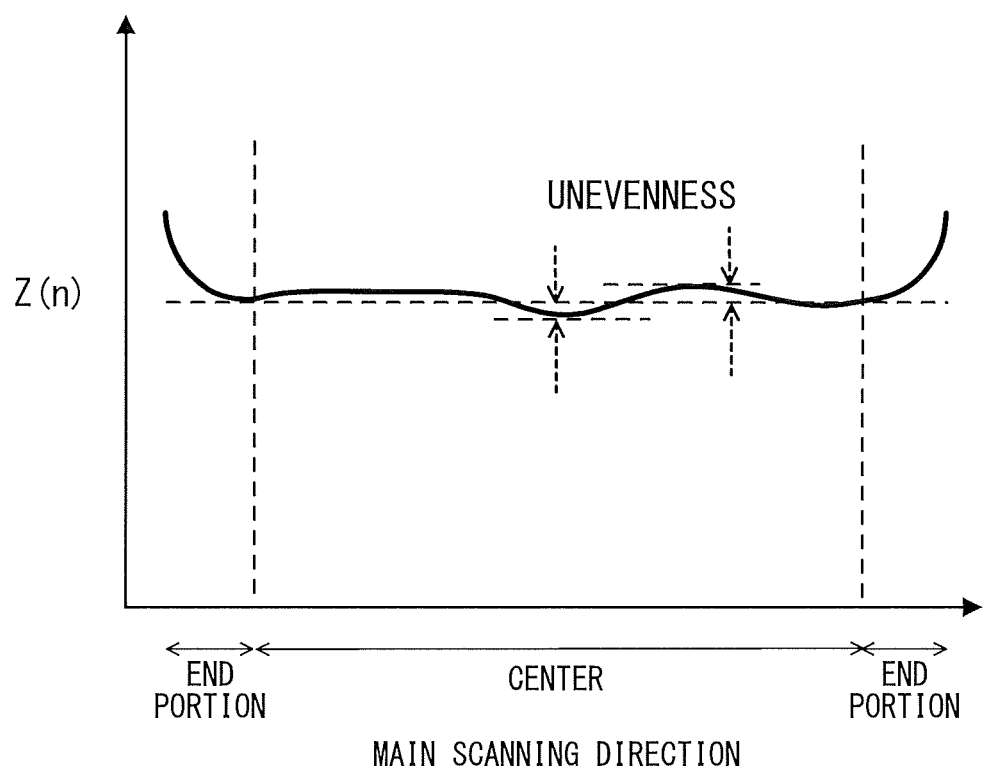
FIG. 6 is an explanatory graph of the correlation data.

FIG. 6 is an explanatory graph of the correlation data piece Z(n). FIG. 6 is a graph for showing a waveform shape indicating the correlation data piece Z(n) of respective positions (pixels) in the main scanning direction. As shown in FIG. 4B, the value of the data piece X(n) greatly decreases in the end portions in the main scanning direction to a level lower than that of the data piece Y(n). Therefore, the correlation data piece Z(n) takes a larger value in the end portions in the main scanning direction. The correlation data piece Z(n) exhibits a substantially flat shape, but has an uneven value, in the central portion in the main scanning direction. The first embodiment is described on the assumption that the reference member 500 is a white member, but the correlation data piece Z(n) exhibits the same waveform shape even in a case where the reference member 500 is a halftone member.

Reading Processing

Figure 7:
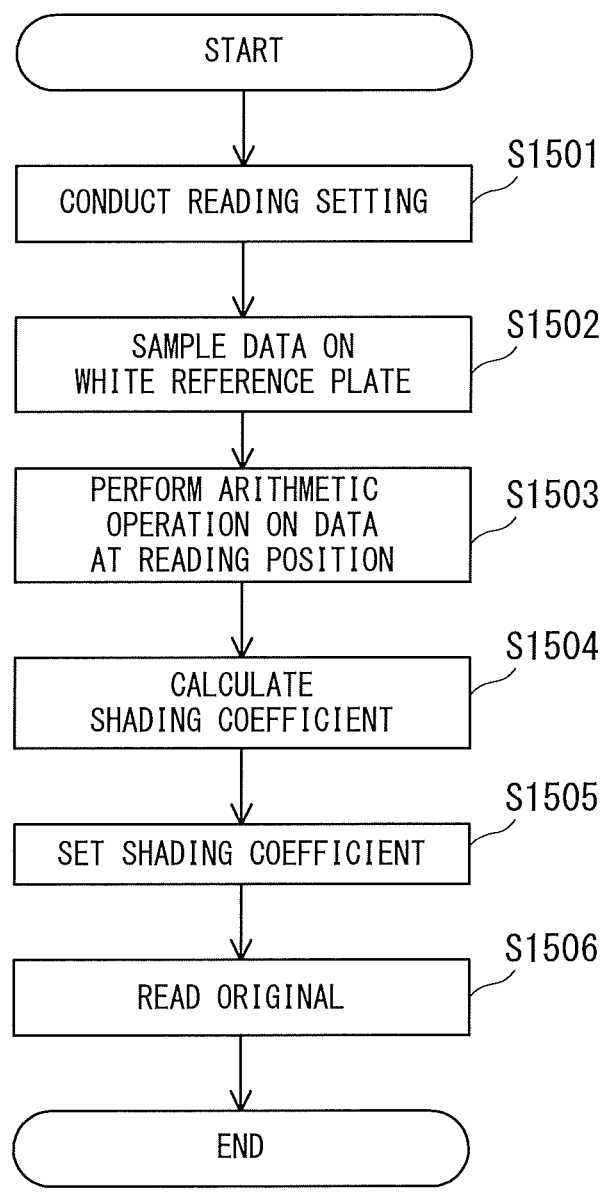
FIG. 7 is a flowchart for illustrating reading processing for an original image.

FIG. 7 is a flowchart for illustrating reading processing for the original image conducted by the image reading apparatus 120 having such a correlation data piece Z(n) stored in the memory 402 for backup. In the reading processing for the original image, the reference member 500 has been removed from the reading position 107.

The CPU 401 conducts the reading setting based on the reading start signal input from the operation unit (Step S1501). For example, the CPU 401 causes the light source 201 to emit light, controls the reading using the line sensor 203, and enables the shading correction based on the reading setting.

The CPU 401 samples the data representing the reading result of the white reference plate 125 obtained by the reading unit 106 (Step S1502). The CPU 401 stores a sampled data piece P(n) being the reading result of the white reference plate 125 in the RAM 405. At this time, the shading correction is enabled, but the shading coefficient is not set, and hence the shading corrector 404 inputs the data representing the reading result of the white reference plate 125 to the CPU 401 as it is.

The CPU 401 performs an arithmetic operation on data at the reading position 107 (Step S1503). For example, the CPU 401 multiplies the data piece P(n) stored in the RAM 405 by the correlation data piece Z(n) stored in the memory 402 for backup in advance, to thereby calculate an arithmetic operation result Q(n) ($Q(n)=Z(n)*P(n)$). The CPU 401 stores the calculated arithmetic operation result Q(n) in the RAM 405.

The CPU 401 calculates the shading coefficient (Step S1504). The CPU 401 calculates a shading coefficient R(n) based on the arithmetic operation result Q(n), and stores the shading coefficient R(n) in the RAM 405. The CPU 401 sets the shading coefficient R(n) in the shading corrector 404 (Step S1505). The shading coefficient R(n) is expressed by the reciprocal of the arithmetic operation result Q(n).

The CPU 401 conducts the reading processing for the original image after setting the shading coefficient R(n) (Step S1506). The CPU 401 causes the light source 201 to emit light, conducts the reading processing using the line sensor 203, drives the original conveying motor 105, and conveys the original 102 so that the original 102 passes through the reading position 107. The original image of the original 102 is thus read by the reading unit 106. The line sensor 203 inputs the analog image signal of the read original image to the A/D converter 403. The A/D converter 403 converts the analog image signal into a digital image signal, and inputs the digital image signal to the shading corrector 404. The shading corrector 404 conducts the shading correction through use of the shading coefficient R(n) set in the processing of Step S1505 with the digital value of the brightness value of each of the pixels along the main scanning direction, which is included in the digital image signal, being used as the original read value. The shading corrector 404 thus derives the shading correction output value. The shading corrector 404 calculates the shading correction output value by, for example, Expression (1).

FIG. 8A to FIG. 8D are explanatory graphs of data to be processed by the CPU 401 in the reading processing for the original image in FIG. 7. In FIG. 8A to FIG. 8D, the brightness distribution of data to be processed by the CPU 401 in the main scanning direction is shown.

Figure 8A:
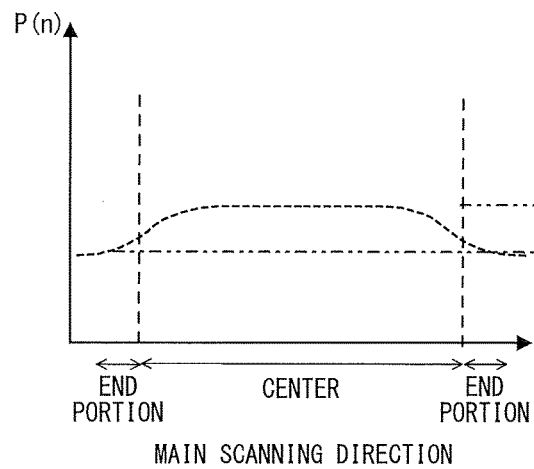
FIG. 8A, FIG. 8B, FIG. 8C, and FIG. 8D are explanatory graphs of data to be processed by a CPU in the reading processing for the original image.

In FIG. 8A, the brightness distribution of the data piece P(n) being the reading result of the white reference plate 125, which is acquired by the CPU 401 in the processing of Step S1502, is shown. The data piece P(n) is not subjected to the shading correction, and is therefore obtained by sampling an illumination brightness distribution itself.

Figure 8B:
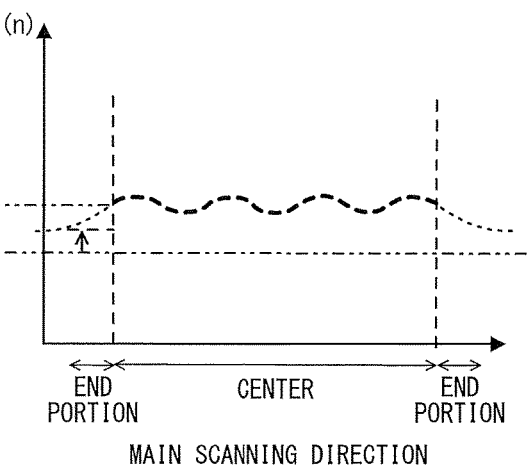

In FIG. 8B, the brightness distribution of the arithmetic operation result Q(n) obtained in the processing of Step S1503 is shown. The arithmetic operation result Q(n) corresponds to the data obtained by reading the reference member 500 at the reading position 107. Because of the nature of the arithmetic operation result $Q(n)=Z(n)*P(n)$, compared with the data piece P(n), the arithmetic operation result Q(n) is corrected so as to become larger in the end portions in the main scanning direction, and exhibits a brightness distribution having unevenness in the central portion.

Figure 8C:
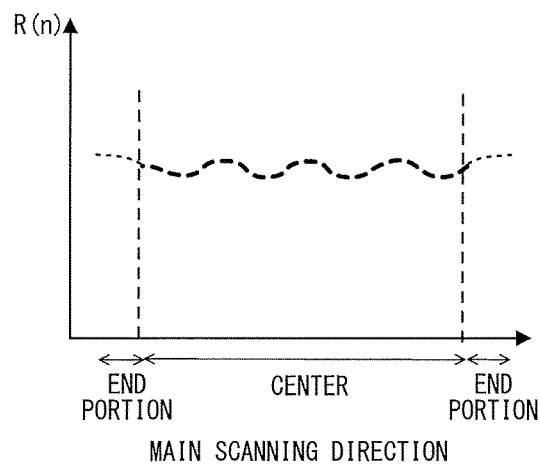

In FIG. 8C, a waveform shape of the shading coefficient R(n) calculated in the processing of Step S1504 is shown. The shading coefficient R(n) is a coefficient for correcting the brightness distribution of the arithmetic operation result Q(n) in the main scanning direction so that the brightness distribution exhibits a flat shape, and is therefore the reciprocal of the arithmetic operation result Q(n).

Figure 8D:
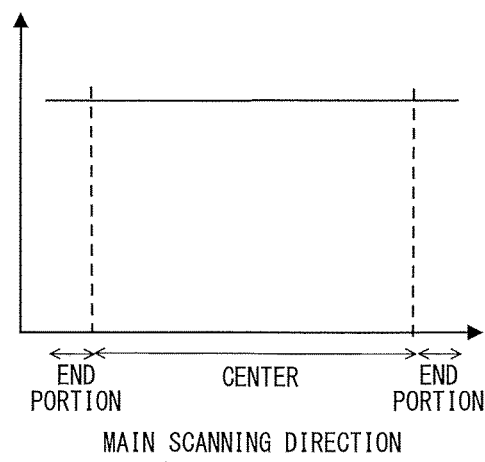

In FIG. 8D, the brightness distribution of the shading correction output value calculated by conducting the shading correction on the original image read in the processing of Step S1506 is shown. The image reading apparatus 120 can read an image exhibiting a flat shape in the main scanning direction by multiplying a result of reading the image of the original 102 by the shading coefficient R(n) for each of the pixels along the main scanning direction. In this manner, the image reading apparatus 120 can suppress an occurrence of an image defect ascribable to the shading correction using the reading result of the white reference plate 125.

First Modification Example

The description of the first embodiment is directed to a configuration in which the correlation data piece Z(n) is derived in advance, but the image reading apparatus 120 may be configured to calculate the correlation data piece Z(n) when the image is read. A configuration of the image reading apparatus 120 according to a first modification example of the first embodiment is the same as that of the first embodiment, and hence a description thereof is omitted.

Processing for Storing Illumination Brightness Distribution Data

Figure 9:
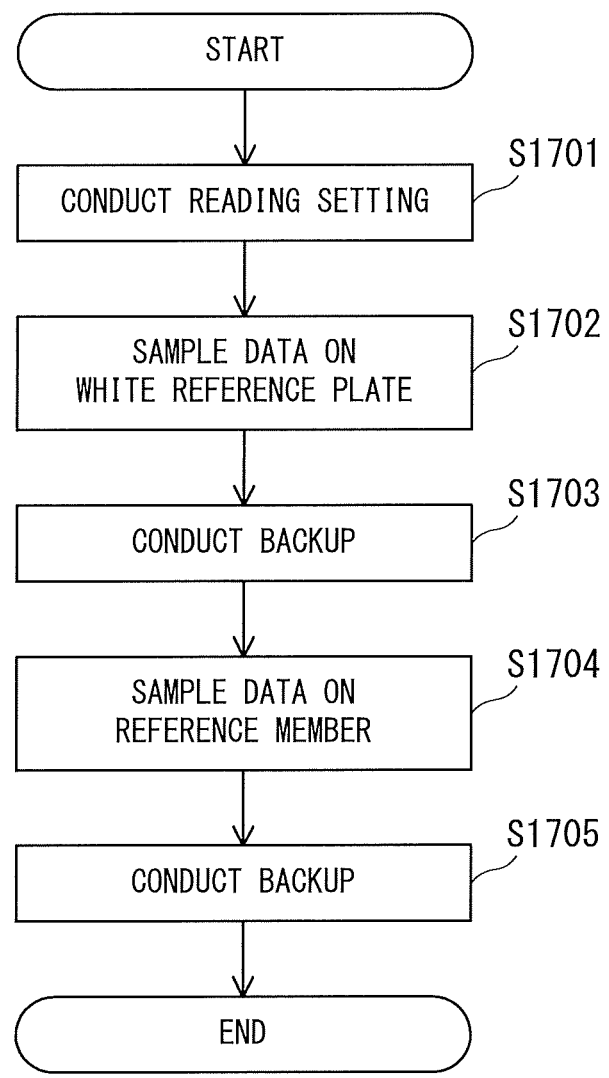
FIG. 9 is a flowchart for illustrating a method of storing the illumination brightness distribution data.

FIG. 9 is a flowchart for illustrating a method of storing the illumination brightness distribution data in the memory 402 for backup. In the same manner as in the processing of Step S1401 and Step S1402 in FIG. 5, the CPU 401 conducts the reading setting, and samples the data representing the reading result of the white reference plate 125 (Step S1701 and Step S1702). The CPU 401 stores a sampled data piece X'(n) being the reading result of the white reference plate 125 in the RAM 405. In this case, n represents the position (pixel) in the main scanning direction. The data piece X'(n) represents the illumination brightness distribution data indicated by, for example, the dotted line in FIG. 4B. The CPU 401 backs up the data piece X'(n) stored in the RAM 405 to the memory 402 for backup (Step S1703).

After the data on the white reference plate 125 is sampled, the operator places the reference member 500 at the reading position 107 as illustrated in FIG. 3B. After placing the reference member 500, the operator inputs the reading start signal to the CPU 401 through the operation unit. The input causes the CPU 401 to sample the data representing the reading result of the reference member 500 obtained by the reading unit 106 (Step S1704). The CPU 401 stores a sampled data piece Y'(n) being the reading result of the reference member 500 in the RAM 405. The data piece Y'(n) represents the illumination brightness distribution data indicated by, for example, the solid line in FIG. 4B. The CPU 401 backs up the data piece Y'(n) stored in the RAM 405 to the memory 402 for backup (Step S1705).

After the above-mentioned processing, the processing for storing the illumination brightness distribution data in the memory 402 for backup is brought to an end. The data pieces X'(n) and Y'(n) are backed up to the memory 402 for backup at the time of factory shipment of the image reading apparatus 120, the timing when the reading unit 106 is replaced, the timing when the control board on which the memory 402 for backup is mounted fails or is replaced, or other such timing.

Reading Processing

Figure 10:
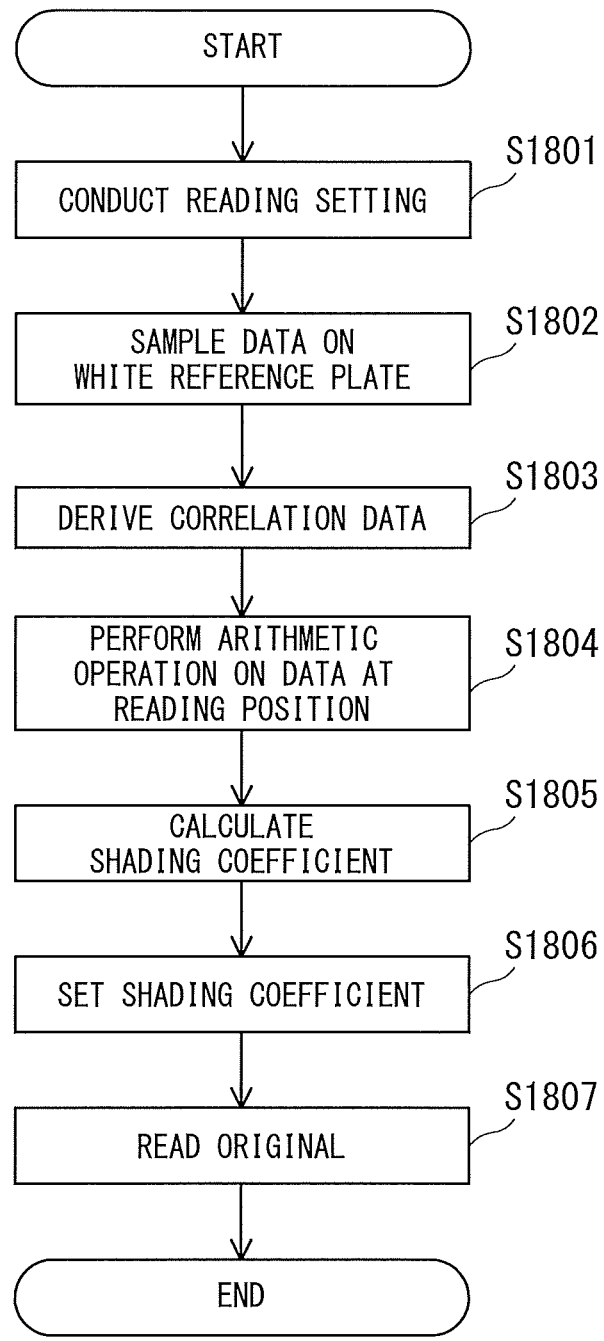
FIG. 10 is a flowchart for illustrating the reading processing for the original image.

FIG. 10 is a flowchart for illustrating the reading processing for the original image conducted by the image reading apparatus 120 having the illumination brightness distribution data stored in the memory 402 for backup. In the reading processing for the original image, the reference member 500 has been removed from the reading position 107. In the same manner as in the processing of Step S1501 and Step S1502 in FIG. 7, the CPU 401 conducts the reading setting, and samples the data representing the reading result of the white reference plate 125 obtained by the reading unit 106 (Step S1801 and Step S1802). The CPU 401 stores a sampled data piece P'(n) being the reading result of the white reference plate 125 in the RAM 405.

The CPU 401 derives the correlation data (Step S1803). The CPU 401 reads the data piece X'(n) and the data piece Y'(n) that are stored in the memory 402 for backup in advance. The CPU 401 divides the read data piece Y'(n) by the data piece X'(n), to thereby calculate a correlation data piece Z'(n) ($Z'(n)=Y'(n)/X'(n)$). The CPU 401 may hold in advance a table for showing a relationship between the correlation data piece Z'(n) and a set of the data piece X'(n) and the data piece Y'(n), and may refer to the table to derive the correlation data piece Z'(n). The CPU 401 stores the derived correlation data piece Z'(n) in the RAM 405.

The CPU 401 performs an arithmetic operation on data at the reading position 107 (Step S1804). For example, the CPU 401 multiplies the data piece P'(n) stored in the RAM 405 by the correlation data piece Z'(n) derived in the processing of Step S1803, to thereby calculate an arithmetic operation result Q'(n) ($Q'(n)=Z'(n)*P(n)$). The CPU 401 stores the calculated arithmetic operation result Q'(n) in the RAM 405.

The CPU 401 calculates the shading coefficient (Step S1805). The CPU 401 calculates a shading coefficient R'(n) based on the arithmetic operation result Q'(n), and stores the shading coefficient R'(n) in the RAM 405. The CPU 401 sets the shading coefficient R'(n) in the shading corrector 404 (Step S1806). The shading coefficient R'(n) is expressed by the reciprocal of the arithmetic operation result Q'(n).

The CPU 401 conducts the reading processing for the original image after setting the shading coefficient R'(n) (Step S1807). The CPU 401 causes the light source 201 to emit light, conducts the reading processing using the line sensor 203, drives the original conveying motor 105, and conveys the original 102 so that the original 102 passes through the reading position 107. The original image of the original 102 is thus read by the reading unit 106. The line sensor 203 inputs the analog image signal of the read original image to the A/D converter 403. The A/D converter 403 converts the analog image signal into a digital image signal, and inputs the digital image signal to the shading corrector 404. The shading corrector 404 conducts the shading correction through use of the shading coefficient R'(n) set in the processing of Step S1806 with the digital value of the brightness value of each of the pixels along the main scanning direction, which is included in the digital image signal, being used as the original read value. The shading corrector 404 thus derives the shading correction output value. The shading corrector 404 calculates the shading correction output value by, for example, Expression (1).

In the same manner as in the first embodiment, the image reading apparatus 120 can read the image corrected so as to exhibit a flat shape in the main scanning direction by conducting the shading correction by the above-mentioned processing. In this manner, the image reading apparatus 120 can suppress the occurrence of the image defect ascribable to the shading correction using the reading result of the white reference plate 125.

Second Modification Example

In a second modification example of the first embodiment, the image reading apparatus 120 sets the correlation data to a more optimal value. A configuration of the image reading apparatus 120 according to the second modification example is the same as that of the first embodiment, and hence a description thereof is omitted.

Processing for Storing Correlation Data

Figure 11:
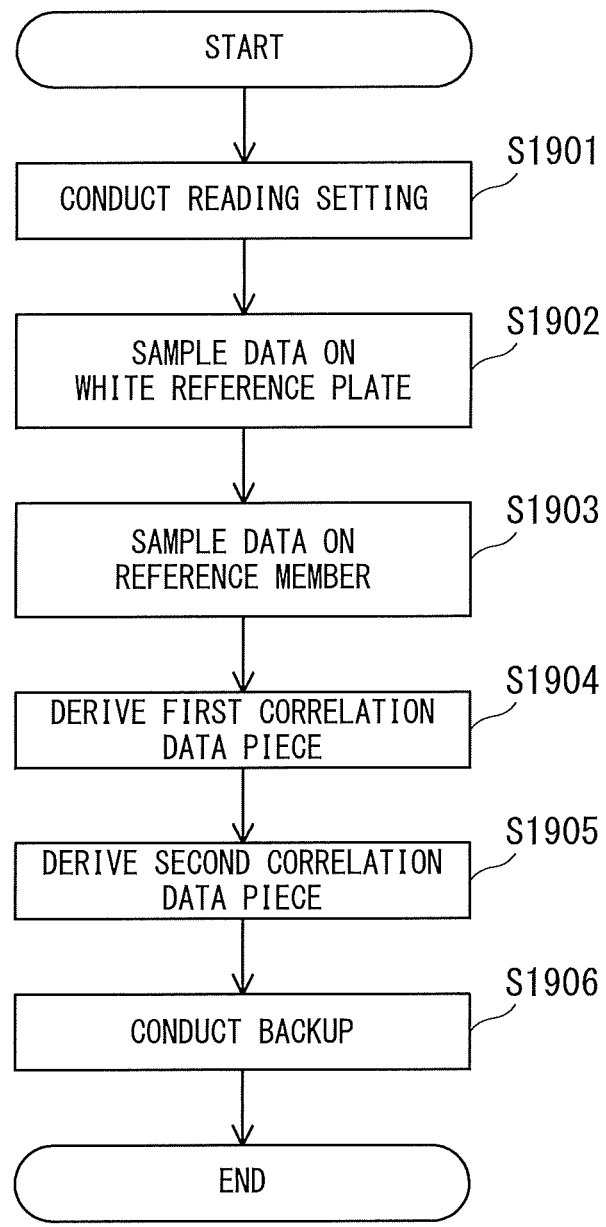
FIG. 11 is a flowchart for illustrating a method of storing the correlation data.

FIG. 11 is a flowchart for illustrating a method of storing the correlation data in the memory 402 for backup. In the same manner as in the processing of Step S1401, Step S1402, and Step S1403 in FIG. 5, the CPU 401 conducts the reading setting, and samples the data representing the reading result of the white reference plate 125 and the reading result of the reference member 500 (Step S1901, Step S1902, and Step S1903). The CPU 401 stores a sampled data piece X"(n) being the reading result of the white reference plate 125 and a sampled data piece Y"(n) being the reading result of the reference member 500 in the RAM 405. In this case, n represents the position (pixel) in the main scanning direction. The data piece X"(n) represents the illumination brightness distribution data indicated by, for example, the dotted line in FIG. 4B. The data piece Y"(n) represents the illumination brightness distribution data indicated by, for example, the solid line in FIG. 4B.

The CPU 401 derives a first correlation data piece based on the data piece X"(n) being the reading result of the white reference plate 125 and the data piece Y"(n) being the reading result of the reference member 500 (Step S1904). In this case, the CPU 401 reads the data piece X"(n) and the data piece Y"(n) from the RAM 405. The CPU 401 divides the read data piece Y"(n) by the read data piece X"(n), to thereby calculate a first correlation data piece C(n) (C(n)= Y"(n)/X"(n)). The CPU 401 may hold in advance a table for showing a relationship between the first correlation data piece C(n) and a set of the data piece X"(n) and the data piece Y"(n), and may refer to the table to derive the first correlation data piece C(n). The CPU 401 stores the derived first correlation data piece C(n) in the RAM 405.

The CPU 401 calculates a second correlation data piece based on the first correlation data piece C(n) (Step S1905). The CPU 401 reads the first correlation data piece C(n) of each pixel from the RAM 405, and performs the following arithmetic operation, to thereby calculate a second correlation data piece D(n). The following description is made on the assumption that the number of pixels along the main scanning direction to be read by the reading unit 106 is set to 5,184. In the following description, k represents a pixel of interest.

(i) When k falls within a range of from the 1st pixel to the 10th pixel, $$D(1) = (C1*10 + C1 + C2 + C3 + C4 + C5 + C6 + C7 + C8 + C9 + C10)/20$$

$$D(2) = (C1*9 + C1 + C2 + C3 + C4 + C5 + C6 + C7 + C8 + C9 + C10 + C11)/20$$

$$D(3) = (C1*8 + C1 + C2 + C3 + C4 + C5 + C6 + C7 + C8 + C9 + C10 + C11 + C12)/20$$

$$D(4) = (C1*7 + C1 + C2 + C3 + C4 + C5 + C6 + C7 + C8 + C9 + C10 + C11 + C12 + C13)/20$$

$$\ldots$$

$$D(10) = (C1*1 + C1 + C2 + C3 + C4 + C5 + C6 + C7 + C8 + C9 + C10 + C11 + C12 + C13 + \ldots C19)/20$$

(ii) When k falls within a range of from the 11th pixel to the 5,175th pixel, $$D(k) = \left(\sum_{n=k-10}^{n=k+9} C(n)\right) / 20$$

(iii) When k falls within a range of from the 5,176th pixel to the 5,184th pixel, $$D(5176) = (C5184*2 + C5183 + C5182 + C5181 + C5180 + C5179 + C5178 + C5177 + C5176 + C5175 + C5174 + C5173 + C5172 + C5171 + C5170 + C5169 + C5168 + C5167 + C5166)/20$$

$$D(5177) = (C5184*3 + C5183 + C5182 + C5181 + C5180 + C5179 + C5178 + C5177 + C5176 + C5175 + C5174 + C5173 + C5172 + C5171 + C5170 + C5169 + C5168 + C5167)/20$$

$$D(5183) = (C5184*9 + C5183 + C5182 + C5181 + C5180 + C5179 + C5178 + C5177 + C5176 + C5175 + C5174 + C5173)/20$$

$$D(5184) = (C5184*10 + C5183 + C5182 + C5181 + C5180 + C5179 + C5178 + C5177 + C5176 + C5175 + C5174)/20$$

The CPU 401 stores the calculated second correlation data piece D(n) in the RAM 405. An example of calculating the second correlation data piece D(n) based on a moving average value of 20 pixels is described above, but the number of pixels to be averaged may be appropriately set to another predetermined number of pixels. The CPU 401 backs up the second correlation data piece D(n) stored in the RAM 405 to the memory 402 for backup (Step S1906).

After the above-mentioned processing, the processing for storing the second correlation data piece D(n) in the memory 402 for backup is brought to an end. The data pieces X'(n) and Y'(n) are backed up to the memory 402 for backup at the time of factory shipment of the image reading apparatus 120, the timing when the reading unit 106 is replaced, the timing when the control board on which the memory 402 for backup is mounted fails or is replaced, or other such timing.

Reading Processing

Figure 12:
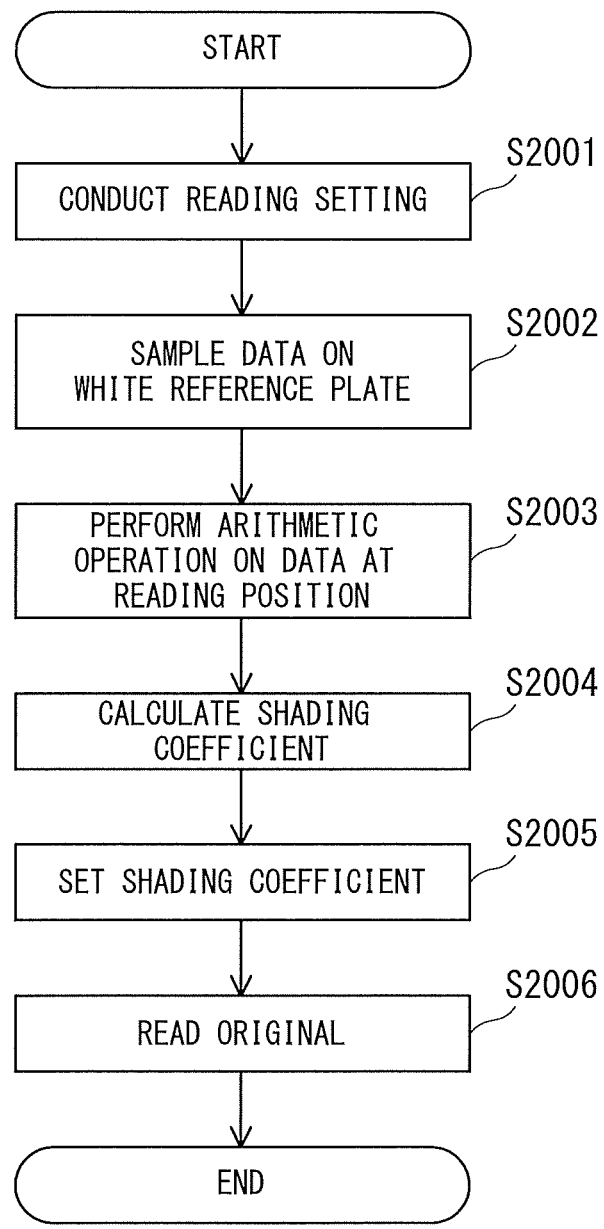
FIG. 12 is a flowchart for illustrating the reading processing for the original image.

FIG. 12 is a flowchart for illustrating the reading processing for the original image conducted by the image reading apparatus 120 having the second correlation data piece D(n) described above stored in the memory 402 for backup. In the reading processing for the original image, the reference member 500 has been removed from the reading position 107.

In the same manner as in the processing of Step S1501 and Step S1502 in FIG. 7, the CPU 401 conducts the reading setting, and samples the data representing the reading result of the white reference plate 125 obtained by the reading unit 106 (Step S2001 and Step S2002). The CPU 401 stores a sampled data piece P"(n) being the reading result of the white reference plate 125 in the RAM 405.

The CPU 401 performs an arithmetic operation on data at the reading position 107 (Step S2003). For example, the CPU 401 multiplies the data piece P"(n) stored in the RAM 405 by the second correlation data piece D(n) stored in the memory 402 for backup in advance, to thereby calculate an arithmetic operation result Q"(n) (Q"(n)=D(n)*P"(n)). The CPU 401 stores the calculated arithmetic operation result Q"(n) in the RAM 405.

In the same manner as in the processing of Step S1504 and Step S1505 in FIG. 7, the CPU 401 calculates the shading coefficient, and sets the shading coefficient in the shading corrector 404 (Step S2004 and Step S2005). The CPU 401 calculates a shading coefficient R"(n) based on the arithmetic operation result Q"(n), stores the shading coefficient R"(n) in the RAM 405, and then sets the shading coefficient R"(n) in the shading corrector 404. The shading coefficient R"(n) is expressed by the reciprocal of the arithmetic operation result Q(n).

In the same manner as in the processing of Step S1506 in FIG. 7, the CPU 401 conducts the reading processing for the original image after setting the shading coefficient R"(n) (Step S2006). The shading corrector 404 conducts the shading correction through use of the shading coefficient R"(n) set in the processing of Step S2005 with the digital value of the brightness value of each of the pixels along the main scanning direction, which is included in the digital image signal, being used as the original read value. The shading corrector 404 thus derives the shading correction output value. The shading corrector 404 calculates the shading correction output value by, for example, Expression (1).

In the same manner as in the first embodiment, the image reading apparatus 120 can read the image corrected so as to exhibit a flat shape in the main scanning direction by conducting the shading correction by the above-mentioned processing. In this manner, the image reading apparatus 120 can suppress the occurrence of the image defect ascribable to the shading correction using the reading result of the white reference plate 125.

Third Modification Example

In a third modification example of the first embodiment, the image reading apparatus 120 sets the correlation data to a more optimal value. A configuration of the image reading apparatus 120 according to the third modification example is the same as that of the first embodiment, and hence a description thereof is omitted.

Processing for Storing Illumination Brightness Distribution Data

Figure 13:
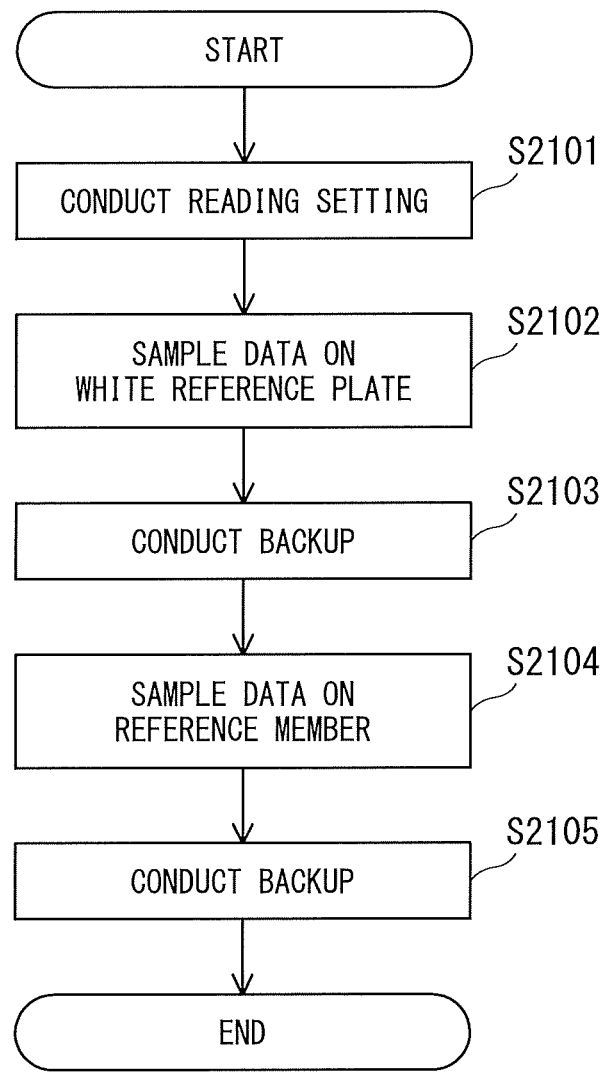
FIG. 13 is a flowchart for illustrating a method of storing the illumination brightness distribution data.

FIG. 13 is a flowchart for illustrating a method of storing the illumination brightness distribution data in the memory 402 for backup. In the same manner as in the processing in FIG. 9 of the first modification example, the CPU 401 backs up a data piece X'"(n) being the reading result of the white reference plate 125 and a data piece Y'"(n) being the reading result of the reference member 500 to the memory 402 for backup (Step S2101 to Step S2105).

After the above-mentioned processing, the processing for storing the illumination brightness distribution data in the memory 402 for backup is brought to an end. The data pieces X'"(n) and Y'"(n) are backed up to the memory 402 for backup at the time of factory shipment of the image reading apparatus 120, the timing when the reading unit 106 is replaced, the timing when the control board on which the memory 402 for backup is mounted fails or is replaced, or other such timing.

Reading Processing

Figure 14:
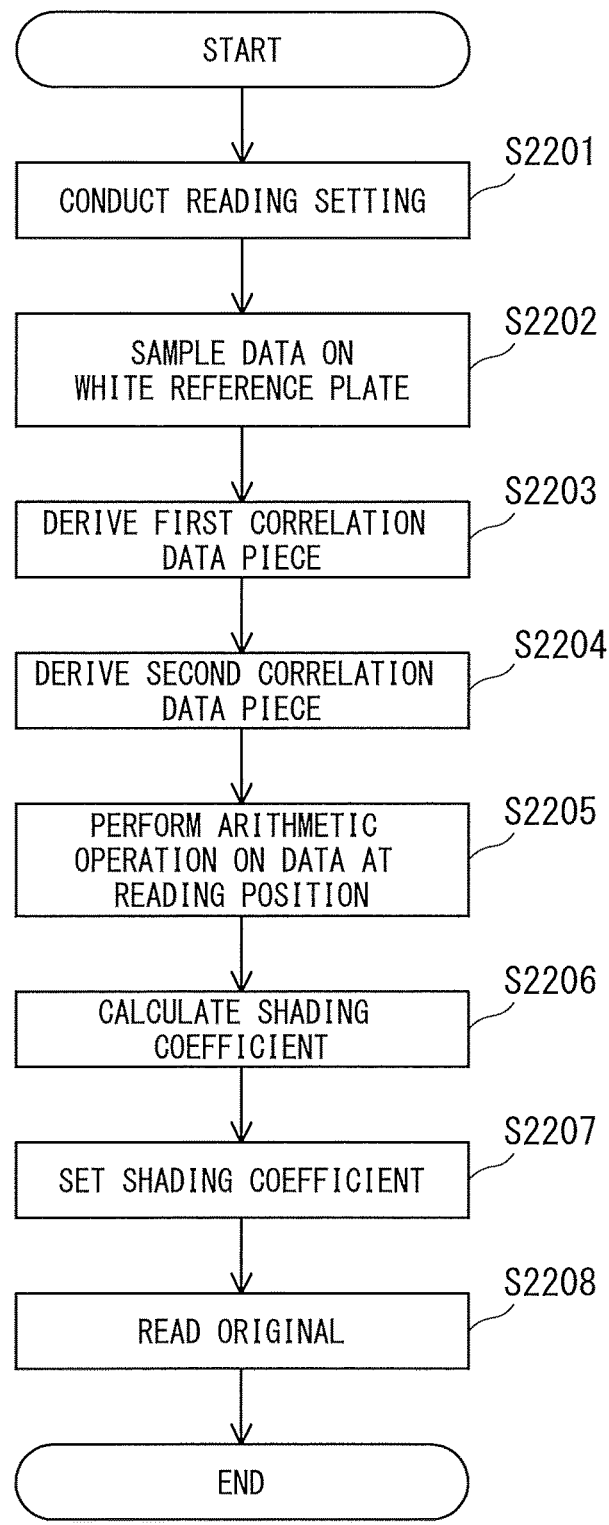
FIG. 14 is a flowchart for illustrating the reading processing for the original image.

FIG. 14 is a flowchart for illustrating reading processing for the original image conducted by the image reading apparatus 120 having the illumination brightness distribution data stored in the memory 402 for backup. In the reading processing for the original image, the reference member 500 has been removed from the reading position 107. In the same manner as in the processing of Step S1801 and Step S1802 in FIG. 10, the CPU 401 conducts the reading setting, and samples the data representing the reading result of the white reference plate 125 obtained by the reading unit 106 (Step S2201 and Step S2202). The CPU 401 stores a sampled data piece P'"(n) being the reading result of the white reference plate 125 in the RAM 405.

The CPU 401 derives a first correlation data piece (Step S2203). The CPU 401 reads the data piece X'"(n) and the data piece Y'"(n) that are stored in the memory 402 for backup in advance. The CPU 401 divides the read data piece Y'"(n) by the read data piece X'"(n), to thereby calculate a first correlation data piece E(n) (E(n)=Y'"(n)/X'"(n)). The CPU 401 may hold in advance a table for showing a relationship between the first correlation data piece E(n) and a set of the data piece X'"(n) and the data piece Y'"(n), and may refer to the table to derive the first correlation data piece E(n). The CPU 401 stores the derived first correlation data piece E(n) in the RAM 405.

The CPU 401 calculates a second correlation data piece based on the first correlation data piece E(n) (Step S2204). The CPU 401 reads the first correlation data piece E(n) of each pixel from the RAM 405, and performs the following arithmetic operation, to thereby calculate a second correlation data piece F(n). The following description is made on the assumption that the number of pixels along the main scanning direction to be read by the reading unit 106 is set to 5,184. In the following description, k represents a pixel of interest.

(i) When k falls within a range of from the 1st pixel to the 10th pixel, $$F(1) = (E1*10 + E1 + E2 + E3 + E4 + E5 + E6 + E7 + E8 + E9 + E10)/20$$

$$F(2) = (E1*9 + E1 + E2 + E3 + E4 + E5 + E6 + E7 + E8 + E9 + E10 + E11)/20$$

$$F(3) = (E1*8 + E1 + E2 + E3 + E4 + E5 + E6 + E7 + E8 + E9 + E10 + E11 + E12)/20$$

$$F(4) = (E1*7 + E1 + E2 + E3 + E4 + E5 + E6 + E7 + E8 + E9 + E10 + E11 + E12 + E13)/20$$

$$\ldots$$

$$F(10) = (E1*1 + E1 + E2 + E3 + E4 + E5 + E6 + E7 + E8 + E9 + E10 + E11 + E12 + E13 + \ldots + E19)/20$$

(ii) When k falls within a range of from the 11th pixel to the 5,173rd pixel, $$F(k) = \left(\sum_{n=k-10}^{n=k+9} E(k)\right)/20$$

(iii) When k falls within a range of from the 5,174th pixel to the 5,184th pixel, $$F(5174) = (E5184*1 + E5183 + E5182 + E5181 + E5180 + E5179 + E5178 + E5177 + E5176 + E5175 + E5174 + E5173 + E5172 + E5171 + E5170 + E5169 + E5168 + E5167 + E5166 + E5165)/20$$

$$F(5175) = (E5184*2 + E5183 + E5182 + E5181 + E5180 + E5179 + E5178 + E5177 + E5176 + E5175 + E5174 + E5173 + E5172 + E5171 + E5170 + E5169 + E5168 + E5167 + E5166)/20$$

$$\ldots$$

$$F(5183) = (E5184*9 + E5183 + E5182 + E5181 + E5180 + E5179 + E5178 + E5177 + E5176 + E5175 + E5174 + E5183)/20$$

$$F(5184) = (E5184*10 + E5183 + E5182 + E5181 + E5180 + E5179 + E5178 + E5177 + E5176 + E5175 + E5174)/20$$

The CPU 401 stores the calculated second correlation data piece F(n) in the RAM 405. An example of calculating the second correlation data piece F(n) based on a moving average value of 20 pixels is described above, but the number of pixels to be averaged may be appropriately set to another predetermined number of pixels. The second correlation data piece F(n) may be calculated by, for example, dividing a moving average value of the data piece Y'''(n) by a moving average value of the data piece X'''(n).

The CPU 401 performs an arithmetic operation on data at the reading position 107 (Step S2205). For example, the CPU 401 multiplies the data piece P'''(n) stored in the RAM 405 by the second correlation data piece F(n) derived in the processing of Step S2204, to thereby calculate an arithmetic operation result Q'''(n) (Q'''(n)=F(n)*P'''(n)). The CPU 401 stores the calculated arithmetic operation result Q'''(n) in the RAM 405.

The CPU 401 calculates the shading coefficient (Step S2206). The CPU 401 calculates a shading coefficient R'''(n) based on the arithmetic operation result Q'''(n), and stores the shading coefficient R'''(n) in the RAM 405. The CPU 401 sets the shading coefficient R'''(n) in the shading corrector 404 (Step S2207). The shading coefficient R'''(n) is expressed by the reciprocal of the arithmetic operation result Q'''(n).

In the same manner as in the processing of Step S1807 in FIG. 10, the CPU 401 conducts the reading processing for the original image after setting the shading coefficient R'''(n) (Step S2208). The shading corrector 404 conducts the shading correction through use of the shading coefficient R'''(n) set in the processing of Step S2207 with the digital value of the brightness value of each of the pixels along the main scanning direction, which is included in the digital image signal, being used as the original read value. The shading corrector 404 thus derives the shading correction output value. The shading corrector 404 calculates the shading correction output value by, for example, Expression (1).

In the same manner as in the first embodiment, the image reading apparatus 120 can read the image corrected so as to exhibit a flat shape in the main scanning direction by conducting the shading correction by the above-mentioned processing. In this manner, the image reading apparatus 120 can suppress the occurrence of the image defect ascribable to the shading correction using the reading result of the white reference plate 125.

Fourth Modification Example

In a fourth example of the first embodiment, the image reading apparatus 120 sets the correlation data to a more optimal value. A configuration of the image reading apparatus 120 according to the fourth modification example is the same as that of the first embodiment, and hence a description thereof is omitted.

Processing for Storing Correlation Data

Figure 15:
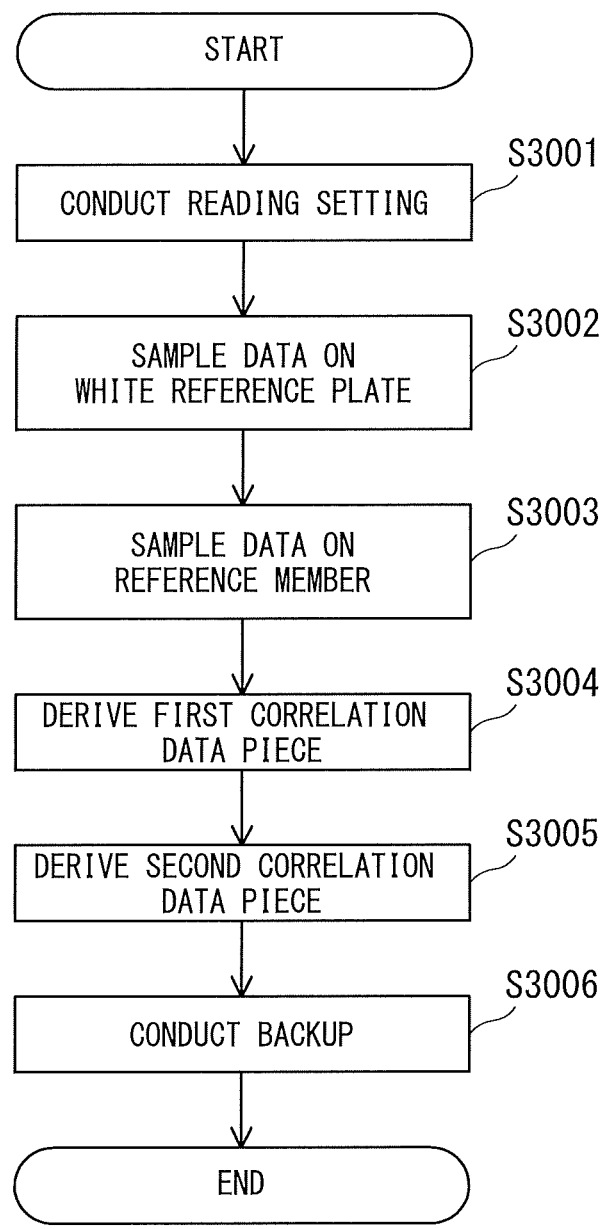
FIG. 15 is a flowchart for illustrating a method of storing the correlation data.

FIG. 15 is a flowchart for illustrating a method of storing the correlation data in the memory 402 for backup. In the same manner as in the processing of Step S1401, Step S1402, and Step S1403 in FIG. 5, the CPU 401 conducts the reading setting, and samples the data representing the reading result of the white reference plate 125 and the reading result of the reference member 500 (Step S3001, Step S3002, and Step S3003). The CPU 401 stores a sampled data piece X'''(n) being the reading result of the white reference plate 125 and a sampled data piece Y'''(n) being the reading result of the reference member 500 in the RAM 405. In this case, n represents the position (pixel) in the main scanning direction. The data piece X'''(n) represents the illumination brightness distribution data indicated by, for example, the dotted line in FIG. 4B. The data piece Y'''(n) represents the illumination brightness distribution data indicated by, for example, the solid line in FIG. 4B.

The CPU 401 derives a first correlation data piece G(n) based on the data piece X''''(n) being the reading result of the white reference plate 125 and the data piece Y''''(n) being the reading result of the reference member 500 (Step S3004). In this case, the CPU 401 reads the data piece X''''(n) and the data piece Y''''(n) from the RAM 405. The CPU 401 divides the read data piece Y''''(n) by the read data piece X''''(n), to thereby calculate a first correlation data piece G(n) (G(n)=Y''''(n)/X''''(n)). The CPU 401 may hold in advance a table for showing a relationship between the first correlation data piece G(n) and a set of the data piece X''''(n) and the data piece Y''''(n), and may refer to the table to derive the first correlation data piece G(n). The CPU 401 stores the derived first correlation data piece G(n) in the RAM 405.

The CPU 401 calculates a second correlation data piece based on the first correlation data piece G(n) (Step S3005). The CPU 401 reads the first correlation data piece G(n) from the RAM 405, and averages the first correlation data piece G(n) for each area of a predetermined number of pixels along the main scanning direction, to thereby calculate a second correlation data piece H(m). In this case, m represents an area formed of a plurality of pixels along the main scanning direction. The first correlation data piece G(n) and the second correlation data pieceH (m) are described later in detail. The CPU 401 backs up the calculated second correlation data piece H(m) to the memory 402 for backup (Step S3006).

After the above-mentioned processing, the processing for storing the second correlation data piece H(m) in the memory 402 for backup is brought to an end. The second correlation data piece H(m) is backed up to the memory 402 for backup at the time of factory shipment of the image reading apparatus 120, the timing when the reading unit 106 is replaced, the timing when the control board on which the memory 402 for backup is mounted fails or is replaced, or other such timing.

Reading Processing

Figure 16:
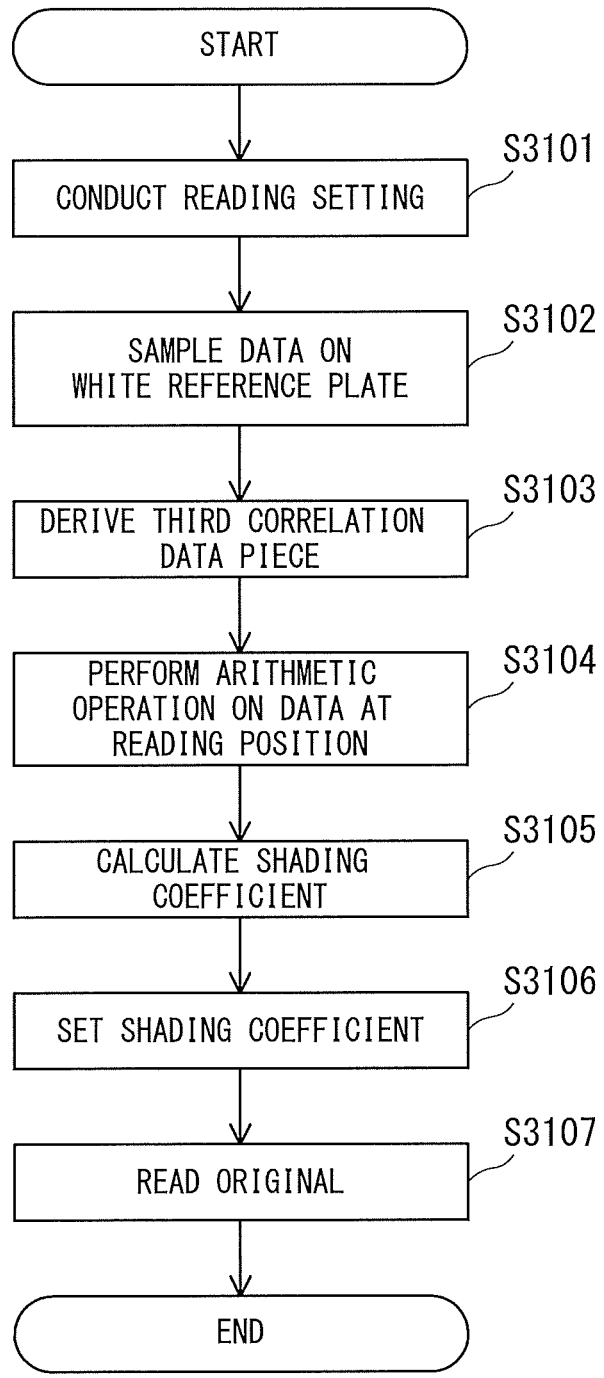
FIG. 16 is a flowchart for illustrating the reading processing for the original image.

FIG. 16 is a flowchart for illustrating reading processing for the original image conducted by the image reading apparatus 120 having the second correlation data piece H(m) stored in the memory 402 for backup. In the reading processing for the original image, the reference member 500 has been removed from the reading position 107. In the same manner as in the processing of Step S1501 and Step S1502 in FIG. 7, the CPU 401 conducts the reading setting, and samples the data representing the reading result of the white reference plate 125 obtained by the reading unit 106 (Step S3101 and Step S3102). The CPU 401 stores a sampled data piece P''''(n) being the sampled reading result of the white reference plate 125 in the RAM 405.

Subsequently, the CPU 401 derives a third correlation data piece (Step S3103). The CPU 401 generates a third correlation data piece J(n) by, for example, conducting linear interpolation on the second correlation data piece H(m) stored in the memory 402 for backup in advance. The third correlation data piece J(n) is described later in detail. The CPU 401 stores the derived third correlation data piece J(n) in the RAM 405.

The CPU 401 performs an arithmetic operation on data at the reading position 107 (Step S3104). For example, the CPU 401 multiplies the data piece P''''(n) stored in the RAM 405 by the third correlation data piece J(n) derived in the processing of Step S3103, to thereby calculate an arithmetic operation result Q''''(n) (Q''''(n)=J(n)*P''''(n)). The CPU 401 stores the calculated arithmetic operation result Q''''(n) in the RAM 405. The arithmetic operation result Q''''(n) corresponds to a reading result obtained by reading the reference member 500 at the reading position 107.

The CPU 401 calculates the shading coefficient (Step S3105). The CPU 401 calculates a shading coefficient R'''' (n) based on the arithmetic operation result Q''''(n), and stores the shading coefficient R''''(n) in the RAM 405. The CPU 401 sets the shading coefficient R''''(n) in the shading corrector 404 (Step S3106). The shading coefficient R''''(n) is a coefficient for correcting the brightness distribution of the arithmetic operation result Q''''(n) in the main scanning direction so that the brightness distribution exhibits a flat shape, and is expressed by the reciprocal of the arithmetic operation result Q''''(n).

The CPU 401 conducts the reading processing for the original image after setting the shading coefficient R''''(n) (Step S3107). The shading corrector 404 conducts the shading correction through use of the shading coefficient R''''(n) set in the processing of Step S3106 with the digital value of the brightness value of each of the pixels along the main scanning direction, which is included in the digital image signal, being used as the original read value. The shading corrector 404 thus derives the shading correction output value. The shading corrector 404 calculates the shading correction output value by, for example, Expression (1).

In the same manner as in the first embodiment, the image reading apparatus 120 can read the image corrected so as to exhibit a flat shape in the main scanning direction by conducting the shading correction by the above-mentioned processing. In this manner, the image reading apparatus 120 can suppress the occurrence of the image defect ascribable to the shading correction using the reading result of the white reference plate 125.

Figure 17A:
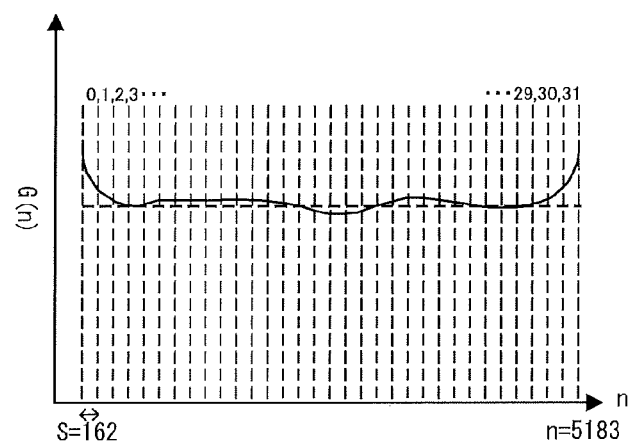
FIG. 17A, FIG. 17B, and FIG. 17C are explanatory graphs of first to third correlation data pieces.
Figure 17B:
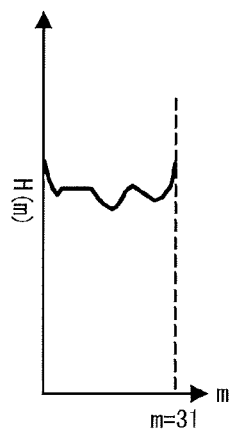
Figure 17C:
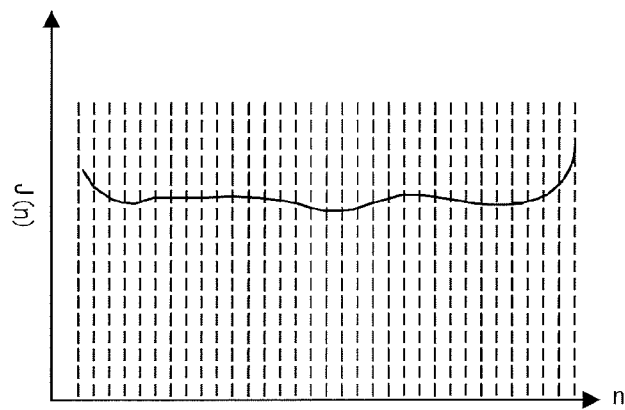

FIG. 17A to FIG. 17C are explanatory graphs of the first to third correlation data pieces.

In FIG. 17A, a waveform shape of the first correlation data piece G(n) in the main scanning direction is shown. As shown in FIG. 4B, the data piece Y''''(n) (solid line) exhibits a substantially flat shape over a range of from the central portion to each end portion in the main scanning direction, whereas the data piece X''''(n) (dotted line) becomes smaller as the position becomes farther from the central portion and closer to each end portion. The first correlation data piece G(n) has a value obtained by dividing the data piece Y''''(n) by the data piece X''''(n), and hence data in each end portion in the main scanning direction becomes larger. The first correlation data piece G(n) is data having unevenness while exhibiting a substantially flat shape in the central portion in the main scanning direction. The waveform shape of the first correlation data piece G(n) in the main scanning direction exhibits the same tendency even when the reference member 500 is a halftone member other than a white member.

In this case, a pixel position in the main scanning direction is represented by n, a maximum value at the pixel position n is represented by N, a position of the area is represented by m, a maximum value at the area position m is represented by M, and the number of pixels per area is represented by S. For example, when the number N of pixels along the main scanning direction is set to 5,184 and the number S of pixels per area is set to 162, the maximum value M in the area becomes 32 (5,184/162). The CPU 401 reads the first correlation data piece G(n) derived in the processing of Step S3004 from the RAM 405, and calculates an average value thereof for each area. The average value of the first correlation data piece G(n) for each area, which is thus calculated, corresponds to the second correlation data piece H(m).

$$H(m) = \{G(S*m+0) + G(S*m+1) \ldots + G(S*m+S-1)\}/S$$

The second correlation data piece H(m) is calculated based on a specific parameter as follows.

$$H(0) = \{G(162*0+0) + G\{162*0+1) \ldots + G(162*0+161)\}/162$$

$$H(1) = \{G(162*1+0) + G\{162*1+1) \ldots + G(162*1+161)\}/162$$

$$H(2) = \{G(162*2+0) + G\{162*2+1) \ldots + G(162*2+161)\}/162$$

$$\ldots$$

$$H(31) = \{G(162*31+0) + G\{162*31+1) \ldots + G(162*31+161)\}/162$$

In FIG. 17B, a waveform shape of the second correlation data piece H(m) in the main scanning direction is shown. The second correlation data piece H(m) is calculated for each area obtained by dividing the positions (pixels) in the main scanning direction, and can therefore have a data amount reduced more greatly than in a case where the correlation data is backed up for all the positions (pixels) in the main scanning direction. The example of setting the number of pixels per area to 162 is described above, but the number of pixels per area may be appropriately set.

In FIG. 17C, a waveform shape of the third correlation data piece J(n) in the main scanning direction is shown. As described above, the third correlation data piece J(n) is derived by conducting the linear interpolation on the second correlation data piece H(m). The third correlation data piece J(n) is calculated based on, for example, the following expression.

$$J(n) = H(n/S) + n\% \, S \times \{H(n/S+1) - H(n/S)\}/S$$

where J(n)=H(n/S) when n/S=M

In the above-mentioned expression, A/B represents a quotient obtained when A is set as a dividend and B is set as a divisor, while A % B represents a residue obtained when A is set as the dividend and B is set as the divisor.

The third correlation data piece J(n) is calculated based on the parameter of the second correlation data piece H(m) shown in FIG. 17B as follows.

$$J(0) = H(0) + 0 \times \{H(1) - H(0)\}/162$$

$$J(1) = H(0) + 0 \times \{H(1) - H(0)\}/162$$

$$\ldots$$

$$J(5021) = H(30) + 161 \times \{H(31) - H(30)\}/162$$

$$J(5022) = H(31)$$

$$\ldots$$

$$J(5182) = H(31)$$

The shading correction output value obtained by conducting the shading correction using a shading coefficient R""(n) based on the third correlation data piece J(n) derived in this manner exhibits such a brightness distribution as shown in FIG. 8D. The brightness distribution exhibiting a flat shape in the main scanning direction is obtained by multiplying a reading result of the original 102 by the shading coefficient R""(n) for each pixel.

As described above, the image reading apparatus 120 according to the first embodiment (including the first modification example to the fourth modification example) is configured to conduct the shading correction based on the correlation data between the reading result of the white reference plate 125 and the reading result of the reference member 500. This enables the image reading apparatus 120 to correct image unevenness ascribable to a difference in the illumination brightness distribution caused by arranging the white reference plate 125 at a position different from the position of the reading position 107. Therefore, the image reading apparatus 120 can suppress the image defect ascribable to the shading correction using the white reference plate 125 arranged at a position different from the reading position of the original.

Second Embodiment

Now, a description is made of an exemplary case in which the present invention is applied to an image reading apparatus. The description on a second embodiment of the present invention takes as an example an image reading apparatus in which an auto document feeder (ADF) is installed. The present invention is also applicable as an image forming apparatus that has functions of the image reading apparatus.

Figure 18:
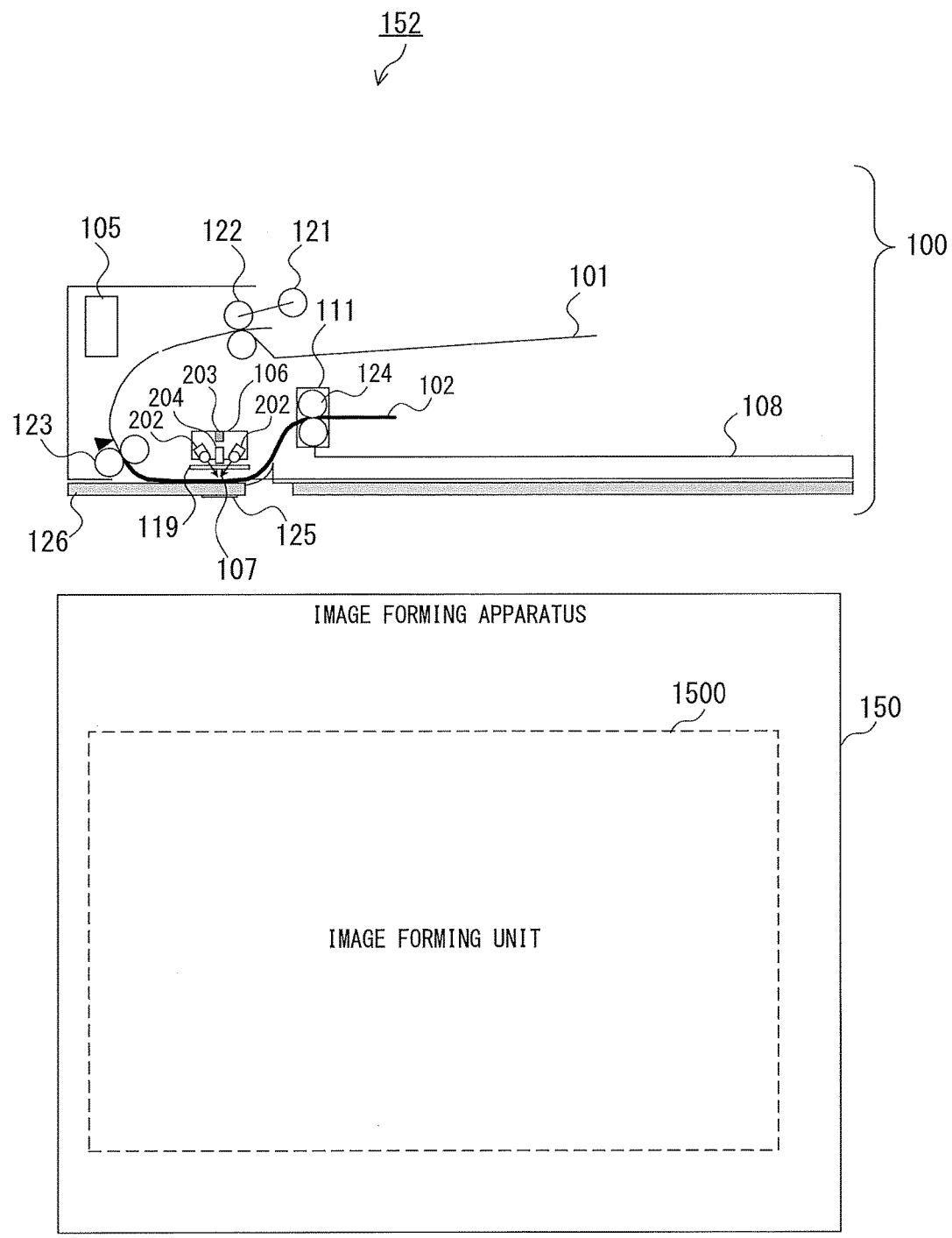
FIG. 18 is a schematic vertical sectional view for illustrating an example of a configuration of an image forming system.

FIG. 18 is a schematic vertical sectional view for illustrating an example of a configuration of an image forming system according to the second embodiment. An image forming system 152 includes an image reading apparatus 100 and an image forming apparatus 150.

The image forming apparatus 150 illustrated in FIG. 18 includes an image forming unit 1500 configured to form an image by a known electrophotographic printing method. The image forming unit 1500 includes a photosensitive member, an exposure device, a developing device, a transfer unit, and a fixing device. The exposure device is configured to form an electrostatic latent image on the photosensitive member based on read data (image data) generated by the image reading apparatus 100 reading the original 102.

In FIG. 18, how image information is read via the reading unit 106 from the original 102 stacked on the original tray 101, which is described later, and fed to the reading position 107 is illustrated. Details of the original reading operation of the image reading apparatus 100 are described later.

The developing device is configured to form a developer image on the photosensitive member by developing the electrostatic latent image formed on the photosensitive member by a developer. The transfer unit is configured to transfer the developer image formed on the photosensitive member onto a predetermined recording medium (for example, a sheet of paper). The fixing device is configured to fix the developer image transferred onto the recording medium to the recording medium. With the above-mentioned configuration, the image forming unit 1500 forms an image corresponding to the image data on the recording medium.

The image reading apparatus 100 in FIG. 18 includes the original tray 101, the original conveying motor 105, the reading unit 106, the delivery tray 108, the original reading glass 119, the original pickup roller 121, the original separating rollers 122, and the original conveying rollers 123. The image reading apparatus 100 also includes the original offset rollers 124, the white reference plate 125, and the original table glass 126.

The original tray 101 is a tray on which one or more originals 102 to be read are to be stacked. The original conveying motor 105 is configured to drive the original pickup roller 121, the original separating rollers 122, the original conveying rollers 123, and the original offset rollers 124, which are configured to convey the original 102.

One or more originals 102 stacked on the original tray 101 are fed one by one onto a conveyance path via the original pickup roller 121, and then conveyed on the conveyance path via the original conveying rollers 123 and the original offset rollers 124.

The original reading glass 119 is placed between the reading unit 106 and the reading position 107. The white reference plate 125 is a reference member used to generate shading data. The original table glass 126 is arranged between the white reference plate 125 and the reading position 107, and functions as a guide member configured to guide an original that is being conveyed in a conveyance direction. The white reference plate 125 serving as a reference member is provided on the opposite side from an area where an original is conveyed with respect to the original table glass 126 serving as a guide member.

The reading unit 106 includes the light guiding body 202, the line sensor 203, for example, a CIS made up of a row of light-receiving elements aligned in a main scanning direction, and the lens 204. The main scanning direction is a direction that is orthogonal to an original conveyance direction, and that aligns with the row of light-receiving elements of the line sensor 203.

The light guiding body 202 is configured to apply light from the light source 201 described later, for example, LEDs, to an original surface (reading surface) of the original 102 at the reading position 107. The light guiding body 202 also has a function of converting the light from the light source 201 into linear light and applying the converted light to the original surface.

The line sensor 203 uses the light-receiving elements to conduct photoelectric conversion on light that has been reflected by the original 102 and led through the lens 204, and outputs an electric signal whose signal intensity is determined by the light intensity of the incident light.

Image information on the original 102 conveyed along the conveyance path is read by the reading unit 106 when the original 102 passes through the reading position 107. The original 102 that has been read by the reading unit 106 is conveyed further to be ejected onto the delivery tray 108.

Figure 19:
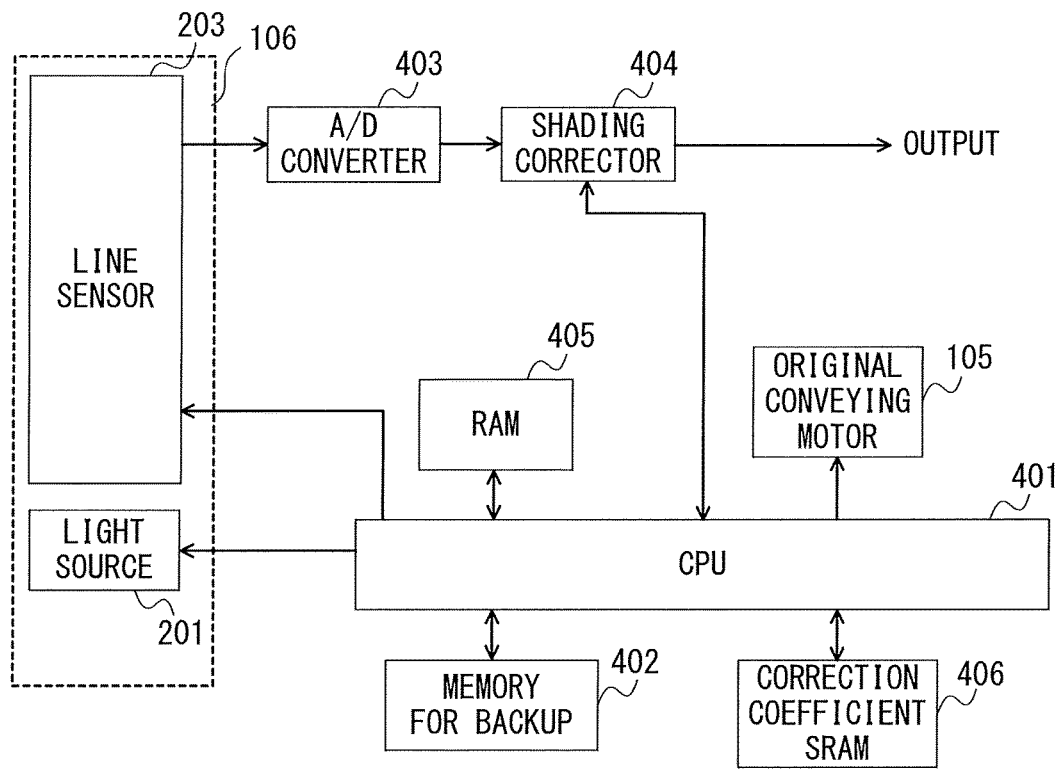
FIG. 19 is a configuration diagram of the control system of the image reading apparatus.

FIG. 19 is a configuration diagram of the control system of the image reading apparatus 100.

The image reading apparatus 100 includes the CPU 401, the memory 402 for backup, the A/D converter 403, the shading corrector 404, and the RAM 405 configured to provide the temporary storage area for calculation. The image reading apparatus 100 further includes a correction coefficient SRAM 406.

The CPU 401 is configured to conduct overall control of the operation of the image reading apparatus 100. The CPU 401 is configured to control the turning on/off of the light source 201, and to control the reading operation of an original image, which is performed by the line sensor 203, the original conveying motor 105, the memory 402 for backup, and other components.

The flow of an image signal that is generated by reading the original 102 is described. An electric signal whose signal intensity is determined by the original's density output from the line sensor 203 is converted from an analog electric signal into a digital image signal by the A/D converter 403. The digital image signal obtained by the conversion and output from the A/D converter 403 is corrected via the shading corrector 404 with regard to the influence of unevenness in the light intensity of the light source 201 and the influence of sensitivity fluctuations among pixels of the line sensor 203. The shading corrector 404 outputs a corrected image signal.

Returning to the description of FIG. 19, the memory 402 for backup is a non-volatile RAM used to store a read value that is obtained by reading the white reference plate 125 for shading correction (hereinafter referred to as "shading data"). The memory 402 for backup is configured so as to be capable of transmitting and receiving data to and from the shading corrector 404 via the CPU 401.

The RAM 405 is configured to temporarily store various types of data that are output from the memory 402 for backup and the shading corrector 404 via the CPU 401.

The correction coefficient SRAM 406 is configured to store a correction coefficient, which is calculated based on a difference obtained by comparing a brightness value (main-scanning-direction central brightness value) in a pixel in a central portion of a reading range in the main scanning direction (main-scanning-direction central portion) with the brightness value of pixels at left and right end portions of the reading range (main-scanning-direction both end portions). The correction coefficient is used to correct shading data that is obtained by reading the white reference plate 125 for shading correction. Details of the correction coefficient calculation are described later.

Details of the shading correction conducted in the shading corrector 404 are described. Shading correction is processing conducted to correct the influence of unevenness in the light intensity of the light source 201 and the influence of sensitivity fluctuations from pixel to pixel in the line sensor 203, based on a read value that is obtained by reading the white reference plate 125 (shading data). Shading correction can be conducted by Expression (2).

(Shading corrected output value)$(n)$={(original read value)$(n)$/(shading data)$(n)$}*(read target value)  Expression (2)

The symbol n in Expression (2) represents the position of a pixel in the line sensor 203. A target value for a read value that is obtained by reading a white reference original is set as the read target value. The shading data is data that is generated by reading the white reference original.

The obtained shading data is stored in the memory 402 for backup as described above. Shading is corrected by reading shading data out of the memory 402 for backup when the original 102 is read, and setting the read shading data to the shading corrector 404. This enables the image reading apparatus 100 to read an original while correcting the influence of unevenness in the light intensity of the light source 201, the influence of sensitivity fluctuations from pixel to pixel in the line sensor 203, or other adverse effects.

Figure 20A:
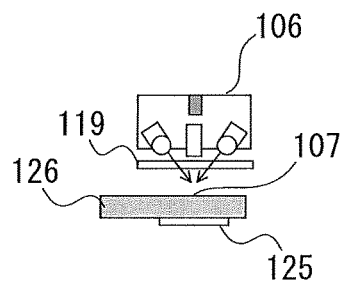
FIG. 20A and FIG. 20B are diagrams for illustrating an example of an operation of a reading unit.
Figure 20B:
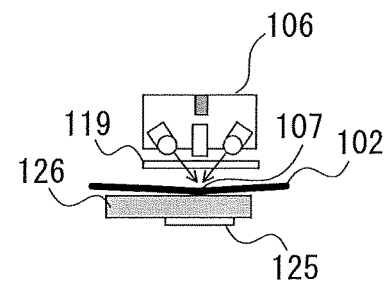

With reference to FIG. 20A and FIG. 20B, description is made of the operation of the reading unit 106 to calculate a correction coefficient used to correct the shading data itself, which is used for shading correction. FIG. 20A and FIG. 20B are diagrams for illustrating an example of an operation of the reading unit 106.

FIG. 20A is a diagram for illustrating a state in which the reading unit 106 reads a surface of the white reference plate 125 through the original reading glass 119 and the original table glass 126. FIG. 20B is a diagram for illustrating a state in which the reading unit 106 reads the original 102 that has been conveyed at the reading position 107.

As illustrated in FIG. 20A and FIG. 20B, the reading unit 106 is configured to be able to read the surface of the white reference plate 125 and read image information of the conveyed original 102.

Figures 21A, 21B:
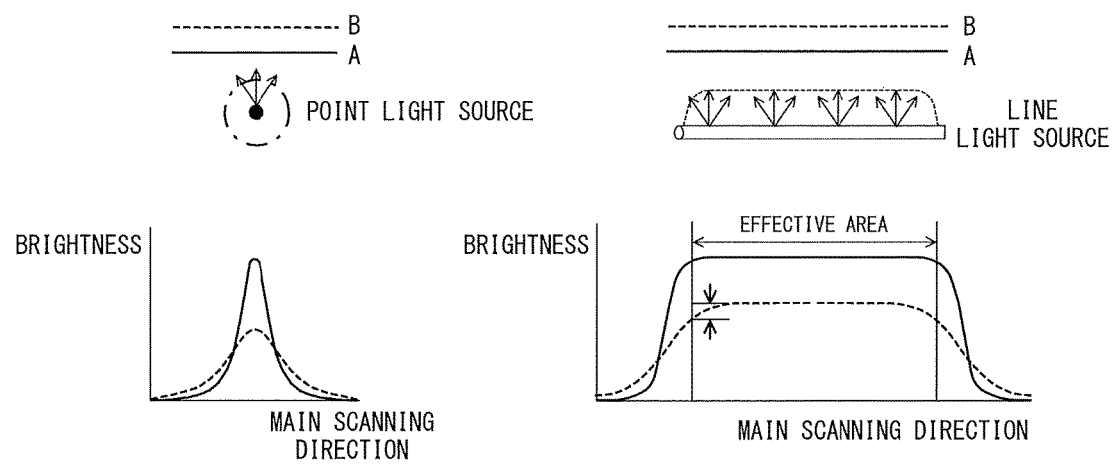
FIG. 21A and FIG. 21B are each a diagram and a graph for illustrating and showing examples of a relationship (illuminance distribution characteristic) between a brightness and a position in a main scanning direction based on a distance from a light source.

FIG. 21A and FIG. 21B are each a diagram and a graph for illustrating and showing examples of a relationship between a position in a main scanning direction and a brightness, which depends on the distance from the light source (illuminance distribution characteristics). The light source in FIG. 21A is a point light source, which irradiates light from a single point (upper half of FIG. 21A), and illuminance distribution characteristics observed when the point light source is used are shown in the graph (lower half of FIG. 21A). The light source in FIG. 21B is a line light source, which irradiates light linearly (upper half of FIG. 21B), and illuminance distribution characteristics observed when the line light source is used are shown in the graph (lower half of FIG. 21B). In each of the graphs, the vertical axis indicates the brightness, and the horizontal axis indicates the main scanning direction.

Lines A and B in FIG. 21A and FIG. 21B each represent a brightness observation point. The line B is relatively greater in the distance from the light source than the line A, that is, observation points of the line B are farther from the light source than observation points of the line A.

When the light source used is a point light source, the point light source has illuminance distribution characteristics in which the distribution is wide in a dark range, with the brightness dropping significantly even at a little distance from the light source as shown in FIG. 21A. Light irradiated via the light guiding body 202 of the reading unit 106, on the other hand, irradiates the original surface as linear light as shown in FIG. 21B. In this case, brightness has an even distribution in the central portion (effective area in FIG. 21B). However, the linear light has such a characteristic that the brightness in each of the end portions is lowered as the distance from the light source becomes larger.

FIG. 22A to FIG. 22D are graphs for showing an example of a relationship between the brightness and each of the pixels along the main scanning direction (main-scanning-direction pixels) during each process of the shading correction. In each of the graphs, the vertical axis indicates the brightness, and the horizontal axis indicates each of the main-scanning-direction pixels arranged in the main scanning direction.

Figure 22A:
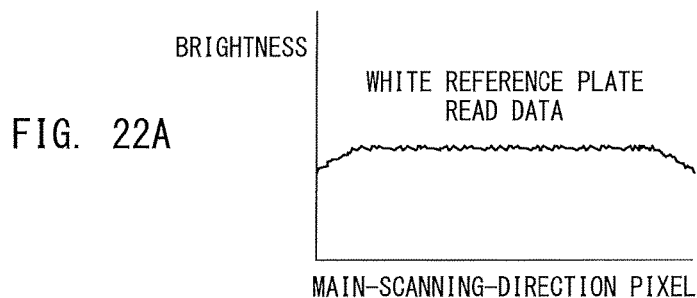
FIG. 22A, FIG. 22B, FIG. 22C, and FIG. 22D are graphs for showing an example of a relationship between the brightness and each of pixels along the main scanning direction during each process of shading correction.

In FIG. 22A, brightness data (brightness value) acquired by reading the white reference plate 125 is shown as an example of white reference plate read data. As described above, the brightness data has such a characteristic that the brightness in each of the end portions is lowered as the distance from the light source becomes larger. Therefore, as shown in FIG. 22A, the brightness data exhibits a substantially uniform brightness distribution in the central portion, while the brightness is relatively lowered in each of the end portions.

Figure 22B:
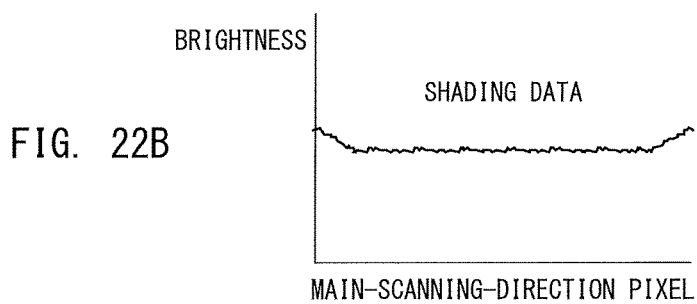

In FIG. 22B, the shading data generated based on the white reference plate read data (brightness data) shown in FIG. 22A is shown.

The image reading apparatus 100 feeds the original 102 (for example, white paper; hereinafter referred to as "reference original") having a uniform density, and reads the reference original located on a guide member while the reference original is passing through the reading position 107.

Figure 22C:
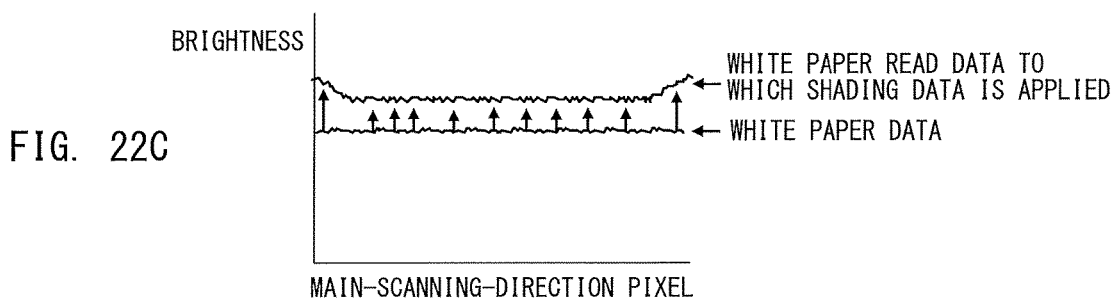

As shown in FIG. 22C, the brightness data acquired from white paper read data obtained by reading the reference original after the application of the shading data, that is, after the shading correction, is not uniform in main-scanning-direction both end portions. That is, the brightness data becomes relatively higher in the main-scanning-direction both end portions than in the main-scanning-direction central portion.

Figure 22D:
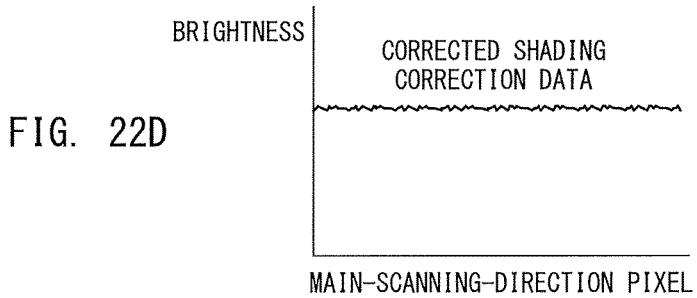

Therefore, the image reading apparatus 100 calculates a correction coefficient for correcting the shading data for each of the pixels in the main-scanning-direction both end portions based on the brightness in the main-scanning-direction central portion and the brightness of each of the pixels in the main-scanning-direction both end portions within the white paper read data. The correction coefficient is applied to the shading data to conduct processing so that such white paper read data as shown in FIG. 22D is achieved.

Figure 23:
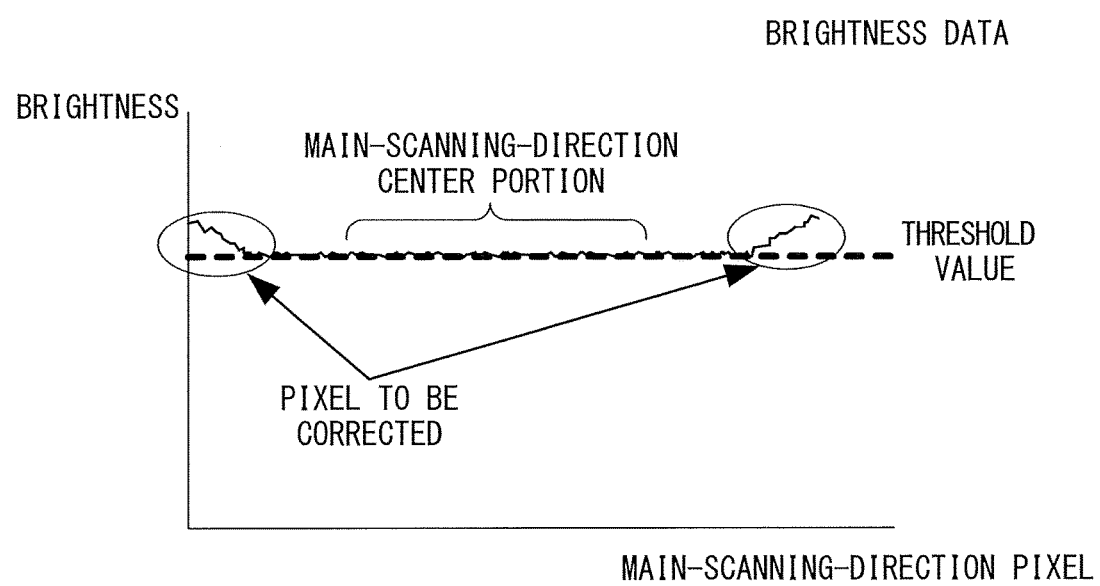
FIG. 23 is a graph for showing how a threshold value is set when a correction coefficient is calculated based on the brightness in a main-scanning-direction central portion and main-scanning-direction both end portions.

FIG. 23 is a graph for showing how a threshold value is set when a correction coefficient is calculated based on the brightness in the main-scanning-direction central portion and the brightness in the main-scanning-direction both end portions. In the graph in FIG. 23, the vertical axis indicates the luminance, and the horizontal axis indicates main-scanning-direction pixels aligned in the main scanning direction.

A brightness value that serves as a threshold value is set based on brightness data in the main-scanning-direction central portion as shown in FIG. 23. The threshold value is, for example, an average of brightness values at a plurality of main scanning points in the main-scanning-direction central portion. The image reading apparatus 100 identifies a pixel that has a brightness value higher than the threshold value as a pixel to be corrected, and calculates a correction coefficient used to correct shading data for this correction target pixel. For a pixel that does not exceed the threshold value, 1 is set as a correction coefficient. The correction coefficient can be calculated by Expression (3).

(Correction coefficient)$(x)$=(threshold brightness)/(pixel brightness exceeding threshold value)$(x)$  Expression (3)

The symbol x represents a pixel that exceeds the threshold value.

A correction coefficient calculated by Expression (3) is stored in the correction coefficient SRAM 406. Corrected shading data can be derived by Expression (4).

(Corrected shading data)$(x)$=(shading data)$(x)$*(correction coefficient)$(x)$  Expression (4)

Figure 24:
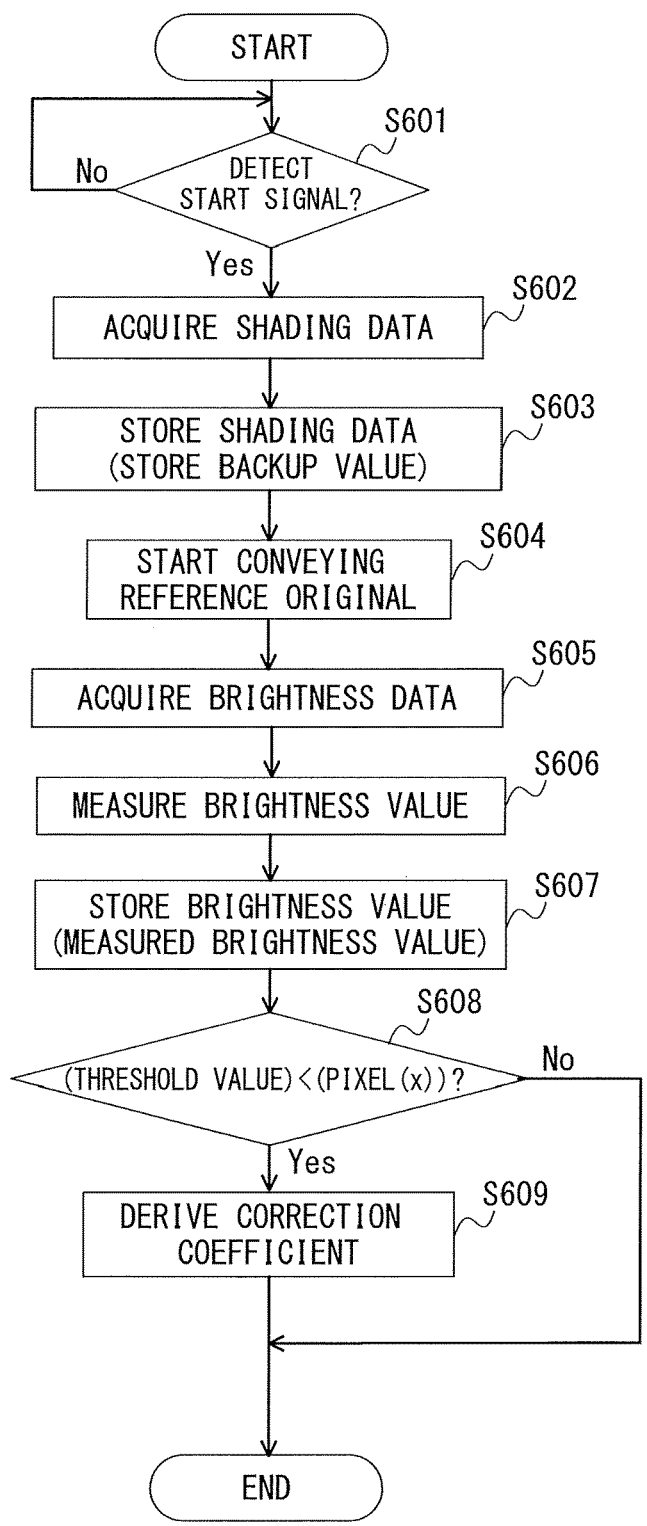
FIG. 24 is a flowchart for illustrating an example of a processing procedure conducted by the image reading apparatus to calculate the correction coefficient for correcting the shading data.

FIG. 24 is a flowchart for illustrating an example of a processing procedure conducted by the image reading apparatus 100 to calculate the correction coefficient for correcting the shading data. The respective processing steps illustrated in FIG. 24 are executed mainly by the CPU 401.

The CPU 401 determines whether or not a start signal for corrected shading data acquisition processing has been detected (Step S601). When a start signal for corrected shading data acquisition processing is detected (Yes in Step S601), the CPU 401 drives the light source 201 and the line sensor 203 to read the white reference plate 125 by the reading unit 106, to thereby acquire shading data (Step S602). The CPU 401 stores the acquired shading data in the memory 402 for backup (Step S603).

The CPU 401 drives the original conveying motor 105 to start conveying the reference original (original 102 having a uniform density) that is placed on the original tray 101 (Step S604). The CPU 401 reads the reference original by the reading unit 106 to acquire the brightness data (Step S605). The CPU 401 measures the brightness value corresponding to the reading position based on the acquired brightness data (Step S606). The CPU 401 stores the measured brightness value in the RAM 405 (Step S607). The CPU 401 derives a brightness average value for the main-scanning-direction central portion based on the measured brightness value, and sets a threshold value based on a result of the derivation.

The CPU 401 reads brightness values stored in the RAM 405 for comparison with the threshold value, and determines whether or not there is a pixel having a brightness value exceeding the threshold value (correction target pixel) (Step S608). When there is a pixel having a brightness value exceeding the threshold value (Yes in Step S608), the CPU 401 advances to the processing of Step S609. Otherwise (No in Step S608), the CPU 401 brings a series of processing to an end.

The CPU 401 calculates a correction coefficient for correcting shading data for the correction target pixel (Step S609). The calculated correction coefficient is stored in the correction coefficient SRAM 406.

In the correction of the shading data based on the correction coefficient, the CPU 401 first reads the shading data from the memory 402 for backup. Then, the CPU 401 conducts a series of processing for applying the correction coefficient stored in the correction coefficient SRAM 406 to the shading data to conduct the correction and storing the shading data subjected to the correction (corrected shading data) in the memory 402 for backup again.

The image reading apparatus 100 according to the second embodiment is thus capable of making the brightness value in the main-scanning-direction central portion and the brightness value at the main-scanning-direction both end portions even (same) with each another at a reading position by correcting shading data for the main-scanning-direction both end portions, even when the reading position and the shading position are two different positions. As a result, the image reading apparatus 100 can correct the shading data and suppress brightness unevenness in the reading range.

Figure 25:
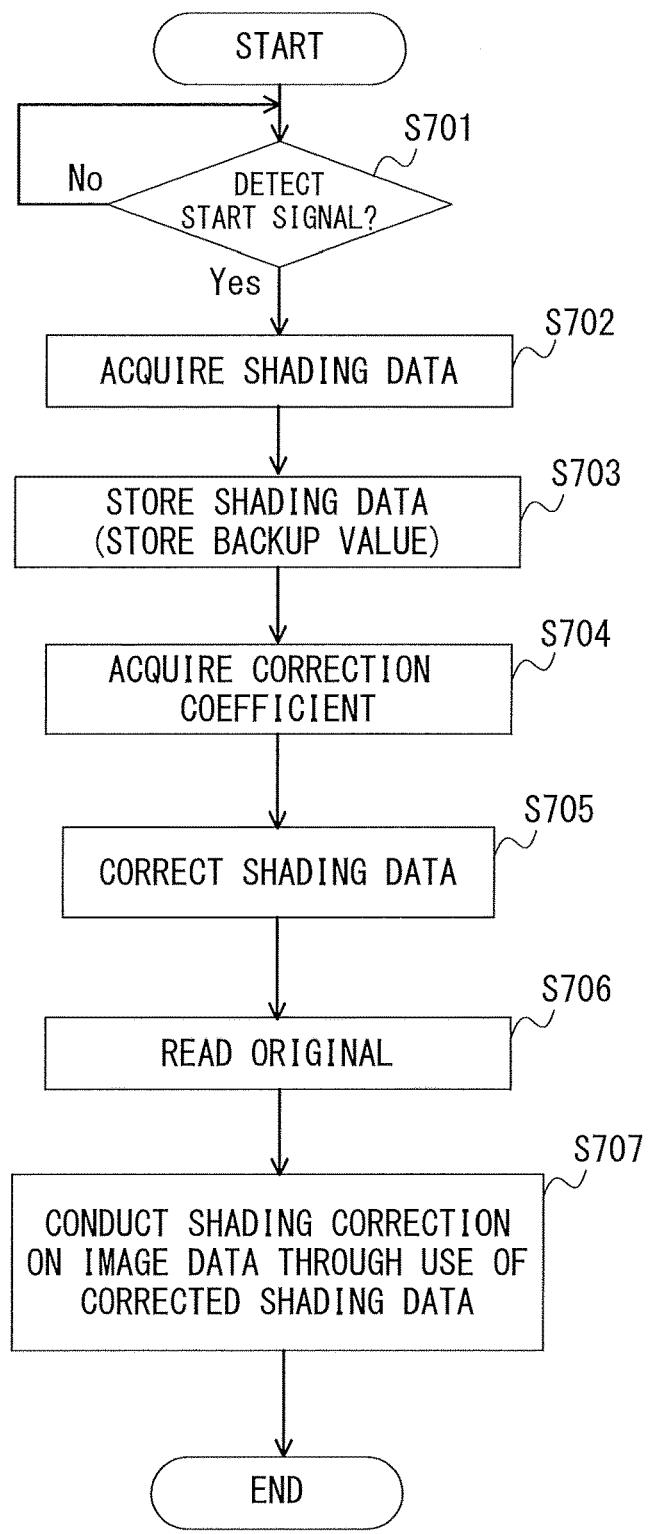
FIG. 25 is a flowchart for illustrating an example of a processing procedure of the shading correction conducted by the image reading apparatus through use of the correction coefficient calculated in advance.

FIG. 25 is a flowchart for illustrating an example of a processing procedure of the shading correction conducted by the image reading apparatus 100 on image data of the original through use of a correction coefficient. The premise here is that a correction coefficient calculated in advance by the processing of Step S602 to Step S609, which are illustrated in FIG. 24, is stored in the correction coefficient SRAM 406. The respective processing steps illustrated in FIG. 25 are executed mainly by the CPU 401.

The CPU 401 determines whether or not a start signal for shading correction processing has been detected (Step S701). When a start signal for shading correction processing is detected (Yes in Step S701), the CPU 401 drives the LED light source 201 and the line sensor 203 to read the white reference plate 125 by the reading unit 106, to thereby acquire shading data (Step S702). The CPU 401 stores the acquired shading data in the memory 402 for backup (Step S703).

The CPU 401 reads and acquires a correction coefficient that is calculated in advance and stored in the correction coefficient SRAM 406 (Step S704). The CPU 401 calculates the corrected shading data through use of Expression (4) based on the shading data stored in Step S703 and the correction coefficient acquired in Step S704 (Step S705). The CPU 401 stores the shading data that has been corrected (corrected shading data) in the memory 402 for backup.

The CPU 401 reads an original (Step S706). The CPU 401 conducts, by the shading corrector 404, shading correction on the result of reading the original (image data) through use of the corrected shading data (Step S707). The CPU 401 conducts shading correction through use of corrected shading data by, when reading the original 102, reading the corrected shading data out of the memory 402 for backup and setting the read data to the shading corrector 404.

The calculation of the correction coefficient described above may be conducted at the time of factory shipment. The image reading apparatus 100 may be configured to be able to execute processing for calculating the correction coefficient based on a user instruction at any timing independent of the timing for the shading correction by employing an operation mode for calculating the correction coefficient.

As described above, the image reading apparatus 100 according to the second embodiment can suppress brightness unevenness in the reading range by correcting shading data based on a brightness that is the result of reading conducted after the shading correction. The above-mentioned embodiments are given just for the purpose of describing the present invention more specifically, and the scope of the present invention is not limited by the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-181274, filed Sep. 16, 2016 and No. 2016-181276, filed Sep. 16, 2016 which are hereby incorporated by reference herein in their entirety.

What is claimed is:
1. An image reading apparatus, comprising:
an original tray on which an original is to be stacked;
a conveyor configured to convey the original from the original tray to a delivery tray along a conveyance path;
a line sensor having a plurality of light-receiving elements and configured to read an image of the original passing through a reading position on the conveyance path;
a white reference plate, a distance between the reading unit and the white reference plate is larger than the distance between the reading unit and the original at the reading position;
a storage unit configured to store a plurality of second correlation data corresponding to the plurality of light-receiving elements;
a generator configured to generate a plurality of shading coefficients based on the plurality of second correlation data and a third reading result obtained by causing the reading unit to read the white reference plate before the original passes through the reading position;
a shading corrector configured to correct a reading result of the original, which is obtained by the reading unit, based on the plurality of shading coefficients; and
a calculating unit configured to
 calculate a plurality of first correlation data corresponding to the plurality of light-receiving elements based on the first reading result of the white reference plate and a second reading result of a reference member placed at the reading position, which are obtained by the reading unit;
 generate the second correlation data based on a moving average value of a first correlation data for N pixels along a main scanning direction;
wherein the reference member, which has a uniform density in the main scanning direction, is placed at the reading position by an operator; and
wherein upon generating the second correlation data which corresponds to pixels from a first pixel to a (N/2−1)th pixel, a weight of a first pixel is determined, corresponding to a pixel position, to be a value larger than 1.

2. The image reading apparatus according to claim 1, wherein the generator is configured to:
store the correlation data generated based on the moving average value of the first correlation data for N pixels along a main scanning direction in advance; and generate the shading coefficient based on a result of multiplying the third reading result by the second correlation data.

3. The image reading apparatus according to claim 1, wherein upon generating the second correlation data which corresponds to pixels from (N/2)th pixel to (N/2)th last pixel, a weight of each pixel is determined to be 1.

4. The image reading apparatus according to claim 3, wherein
upon generating the second correlation data which corresponds to pixels from (N/2−1)th pixel to a last pixel, a weight of a last pixel is determined, corresponding to a pixel position, to be a value larger than 1.

* * * * *